United States Patent
Beacall et al.

(10) Patent No.: US 11,394,476 B2
(45) Date of Patent: Jul. 19, 2022

(54) TELECOMMUNICATION SYSTEM HAVING A MODULATION FORMAT BASED UPON DEGRADATION PREDICTIONS

(71) Applicant: Infinera Corp., Annapolis Junction, MD (US)

(72) Inventors: Steven William Beacall, Bridgwater (GB); Sumudu Geethika Edirisinghe, Newmarket (GB)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/127,432

(22) Filed: Dec. 18, 2020

(65) Prior Publication Data

US 2022/0131627 A1  Apr. 28, 2022

Related U.S. Application Data

(60) Provisional application No. 63/106,466, filed on Oct. 28, 2020.

(51) Int. Cl.
*H04B 17/00* (2015.01)
*H04B 17/373* (2015.01)
*H04L 27/38* (2006.01)
*H04L 27/36* (2006.01)

(52) U.S. Cl.
CPC ........... *H04B 17/373* (2015.01); *H04L 27/36* (2013.01); *H04L 27/38* (2013.01)

(58) Field of Classification Search
CPC . H04L 25/0262; H04L 1/0002; H04L 27/345; H04B 10/564; H04B 10/516; H04B 10/502; H04J 14/0287
USPC .................................................. 375/225, 260
See application file for complete search history.

(56) References Cited

U.S. PATENT DOCUMENTS

| | | | |
|---|---|---|---|
| 2019/0109752 A1* | 4/2019 | Zhang | H04L 27/345 |
| 2019/0149387 A1* | 5/2019 | Torbatian | H04B 10/5161 |
| | | | 375/298 |
| 2019/0149390 A1 | 5/2019 | Torbatian et al. | |

* cited by examiner

*Primary Examiner* — Khai Tran
(74) *Attorney, Agent, or Firm* — Dunlap, Codding PC; David L. Soltz

(57) ABSTRACT

A control circuit, comprising a processor, and a computer readable medium is described. The computer readable medium stores logic that causes the processor to analyze performance data of a link carrying data encoded in a first modulation format with a degradation prediction algorithm to determine a predicted level of degradation of the link. The processor provides first control signals to a transmitter block, and second control signals to a receiver block based upon the predicted level of degradation of the link over time. The first control signals cause the transmitter block to encode data to be transmitted over the link in a second modulation format. The second control signals cause the receiver block to decode data received from the link using the second modulation format. The first and second modulation formats conform to requirements of a same m-quadrature amplitude modulation protocol.

20 Claims, 29 Drawing Sheets

Fig. 10

| Input Bit sequence | 000 | 001 | 010 | 011 | 100 | 101 | 110 | 111 |
|---|---|---|---|---|---|---|---|---|
| Codewords | 00111 | 01011 | 01101 | 01110 | 10101 | 10110 | 11001 | 11010 |

TELECOMMUNICATION SYSTEM HAVING A MODULATION FORMAT BASED UPON DEGRADATION PREDICTIONS

INCORPORATION BY REFERENCE

This Applications claims priority under 35 U.S.C. § 119 to U.S. Provisional Patent Application No. 63/106,466, filed on Oct. 28, 2020, the entire content of which is incorporated by reference herein in its entirety.

BACKGROUND

Terrestrial based telecommunication systems are normally designed for a life span of usually 5 years. The design criteria used assumes that a penalty of 2-3 dB for repairs will occur in every span during that 5-year life span. As a terrestrial system uses automatic gain control amplifiers, gains and power levels can be adjusted to overcome the induced penalties of these repairs.

Submarine systems operate with a longer expected life span, typically 25 years. Within that period, it is expected that subsea fiber loss will increase by 0.005 dB/km. Within that cable it is estimated that 5% of the repeater pumps will fail. Repairs vary depending upon water depth. It is typically expected that 1 repair of 3 dB for every 1000 km in deep water, 1 repair of 0.5 dB for every 20 km in shallow water and 1 repair of 0.5 dB for every 20 km in land sections will occur. Amplifiers within repeaters of subsea wet plants do not have the ability to use automatic gain controls to overcome repair induced penalties and traditionally systems are pre deployed with enough Q margin to accommodate both repairs and aging As part of the subsea acceptance criteria, a power budget table is created that incorporates the above repair losses. These losses along with ageing generally accumulate between 0.7 dB to 2 dB acceptance Q impairment depending on the repeater type and length of the subsea link. In addition to this impairment a further 0.5 dB or 1 dB segment margin is added. Most subsea links however experience lower repairs and fiber ageing than those values allocated within the power budget table. Due to this most of the performance margin allocated within that power budget table is never used during the lifetime of the cable.

Coherent technology modulation formats currently deployed on subsea segments require fairly large optical signal to noise ratio (OSNR) steps between modulation formats. Optical communication systems are known in which data is carried over amplitude/phase modulated optical signals that are transmitted along an optical fiber link to a receiver node. Such optical signals may be transmitted in accordance with a variety of standard quadrature amplitude modulation protocols using polarization multiplexing (also known as dual polarization), such as binary phase shift keying (BPSK), 3-quadrature amplitude modulation (3-QAM), quadrature phase shift keying (QPSK, or 4-QAM), 8-QAM, 16-QAM, 32-QAM, and 64-QAM, with fixed spectral efficiency (SE) of 2, 3, 4, 6, 8, 10, and 12 b/dual-pol-symbol, respectively. In some versions, these modulation protocols are uniformly distributed, such that transmission of each symbol, each of which having a corresponding constellation point, is equally probable. Put another way, the probability of any signal point of the constellation or constellation point is the same as the probability of occurrence of any other signal point of the constellation.

For communication systems in which symbols are transmitted in accordance with uniform discrete signal constellations, the required signal power to noise power ratio (SNR) for error free communication with uniform probability occurrence is normally away from the Shannon limit regardless of the strength of the employed forward error correction (FEC). This gain loss, which increases at higher spectral efficiency, reaches to up to 1.53 dB for a n-dimensional (n-D) cube constellations, which are square constellations expanded over n complex dimensions, as n goes to infinity.

Techniques for modifying the probabilities of any constellation point are disclosed in U.S. Patent Publication No. 2019/0149390, published on May 16, 2019. Modifying the probabilities of constellation points as disclosed in U.S. Patent Publication No. 2019/0149390 allows the required signal power to noise ratio to track closer to the Shannon limit than when each constellation point has a uniform probability of occurrence.

A given spectral efficiency (SE) may be associated with a specific probability distribution for a corresponding constellation. Thus, different SEs may be obtained by changing the probability distribution such that the modulation symbols are output with a variable transmission frequency in accordance with the probability distribution that is variable based on a control signal from the control circuit 88. This is equivalent to designing a single circuit to accommodate many different modulation formats to approximate the Shannon capacity limit for a given link. Thus, in addition to improved SNR gain, probabilistic constellation shaping provides a mechanism to finely tune the SE to maximize the transmission data rate over a communication link at a fixed desired SNR margin.

Current probabilistic constellation shaping schemes include: JPEG based arithmetic coding, constant composition distribution matching (CCDM), enumerative coding, and m-out-of-n coding. In each such techniques an incoming bit stream is encoded into a codeword indicative of the transmission probability distribution.

BRIEF DESCRIPTION OF THE DRAWINGS

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

FIG. 10 illustrates a table that lists examples of input bit sequences and corresponding codewords consistent with a further aspect of the present disclosure;

FIG. 18 illustrates a constellation of points and corresponding transmission probabilities for each point consistent with the present disclosure;

DESCRIPTION OF THE EMBODIMENTS

Figure 1:
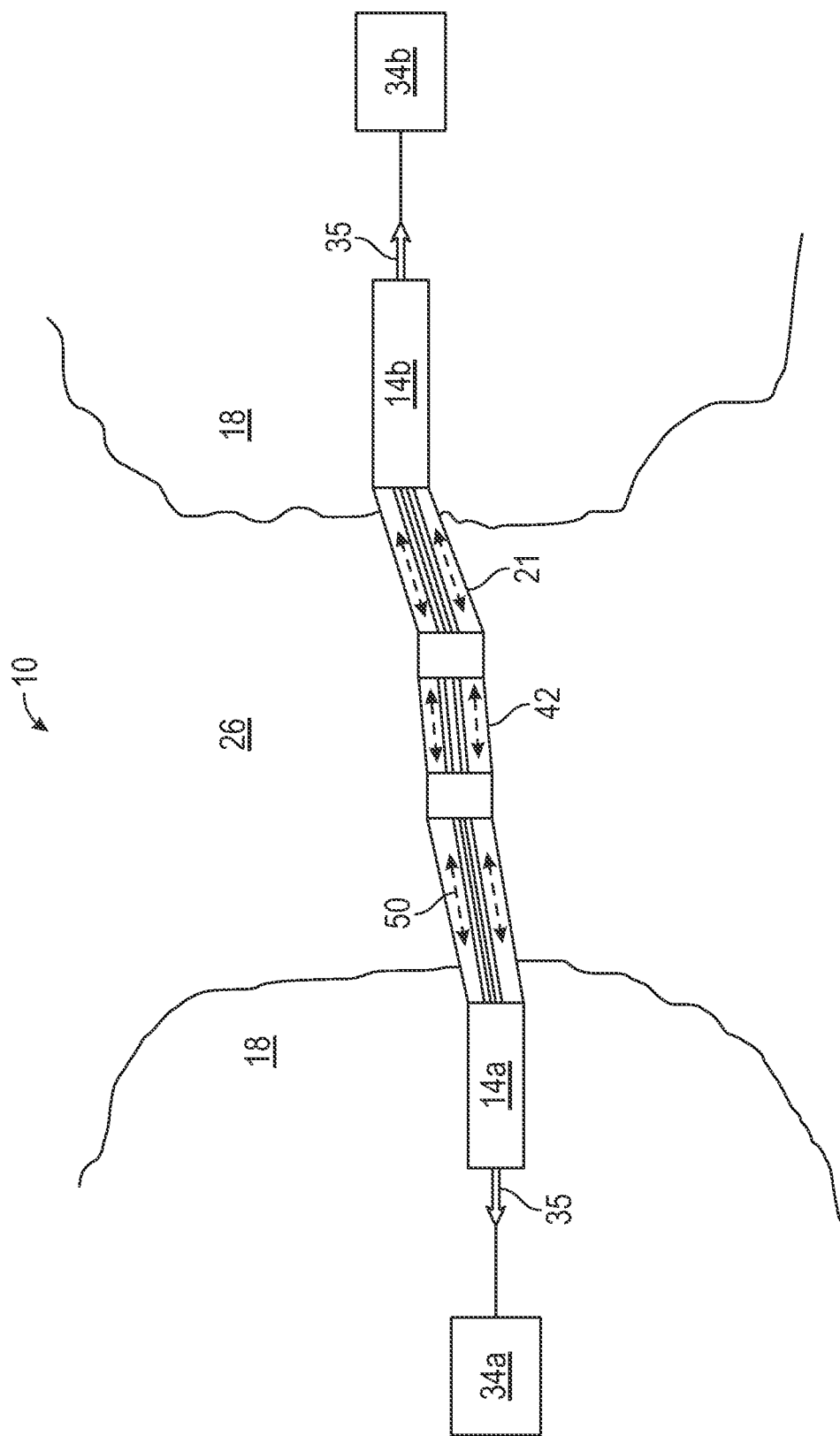
FIG. 1 illustrates a block diagram of an exemplary subsea optical communication system consistent with an aspect of the present disclosure.

With probabilistic shaping and sub mode availability, modifying the data rate and/or capacity of a link in bits per second throughput can be adjusted in greater granularity as each mode step can be accomplished in as little as 0.1 dB of OSNR or Q performance for that given subsea link at that specific frequency. In other words, if the OSNR or Q performance is greater than required by the current mode by 0.1 dB the mode format can be changed thereby increasing data throughput. Conversely if OSNR or Q performance is less than required by the current mode by 0.1 dB then that mode rate can be changed reducing data throughput. Previous modulation formats required over 3 dB of either OSNR or Q performance greater than required for that current mode requirement to operate before a mode change could be made and hence data throughput to be increased. Conversely, previously if current OSNR or Q was only 0.1 dB below that was required for that current modulation mode then a mode would have to be used that required over 3 dB of either OSNR or Q performance less than the current mode in use. Previously with such large changes required in either OSNR or Q performance for a mode or modulation change, data throughput for that carrier would be greatly reduced or Q margin would not be used for data traffic throughput. Although mode changes can be made for every 0.1 dB of OSNR or Q performance, it would be recommended in some embodiments that changes are made in 0.5 to 1.0 dB of OSNR or Q in relation to the current mode requirement however would be configurable in 0.1 dB OSNR or Q performance steps. This now gives the opportunity to adjust the capacity of a link in many distinct sub steps. In accordance with the present disclosure, the use of these distinct sub steps can be used to utilize either or both this excess and repair margins to increase the capacity of a link when the link is deployed. Excess and repair margin is an extra Q that may be specified above a FEC limit to cover repairs and degradation of equipment. Increasing the capacity of the link can be achieved by changing the modulation format of the optical carriers and therefore the data rate and/or capacity described in the disclosure below, in an immediate and automated methodology to ensure continued effective transmission through the transmission paths even though the capacity of the transmission path components decrease over time or are reduced due to breakage or repairs. As the technical solutions described herein can be automated via software, running on at least one processor of a control circuit, the solution described in the present disclosure is applicable to both subsea and terrestrial transmission paths. Lastly due to the software, and, in some embodiments, artificial intelligence monitoring of the transmission paths, modulation format changes can be effectively planned during a service effecting maintenance window thereby reducing transmission path downtime. The control circuit, in some embodiments, has an artificial intelligence module that generates control signals based on degradation of the optical communication path.

The key to successful business is to obtain break-even point in the minimum amount of time with a given investment thereby increasing overall return on investment (ROI). Due to the cost of telecommunications equipment this break-even point can be several years after initial deployment. Revenue is effectively derived from deployed bandwidth within a given link of a transmission path. Telecommunication systems are routinely operated at less than the transmission path's maximum capacity to take into account any degradation of the transmission path due to ageing or repair. Further, any reduction in the bandwidth is routinely made on a 1 dB or more basis. In most cases this totals to a minimum reduction of 1.5-2 dB of Q performance below the transmission path's maximum capacity at any given instant of time.

In some embodiments of the present disclosure, bandwidth reduction can be made in a range of 0.1 dB-1 dB of Q performance by changing the modulation format. Therefore, by actively predicting and utilizing the ageing and repair margins plus foregoing any additional margin requirements, the telecommunication equipment can be operated at the most spectrally efficient modulation format at the time of installation, and maintained at the most spectrally efficient modulation format as the components in the transmission path age. This increases deployed capacity per component, e.g., a transceiver card, repeater, optical fiber cable, increasing the total transmission path capacity. This enhanced transmission path capacity can then result in increased revenue based upon capacity that would not otherwise be utilized in conventional telecommunication systems. Alternatively, by increasing capacity per transceiver (or transmission path) initial capacity requirements may reduce the initial need for deployable transceiver count reducing initial capital expenditure investment. Lastly by using the system of the present disclosure, operational cost per bit is reduced as invariably the same environmental costs such as power and temperature controls remain the same for the higher capacity modulation formats.

In the event of an optical fiber cable repair which causes measurable changes in the receive OSNR, the modulation format can be changed to maximize the transmission capacity subsequent to the fiber cable repair. This can be accomplished by the software monitoring the OSNR (or other performance attribute such as the Q factor) and then setting an appropriate modulation format for the next modulation format to be selected and deployed using the software tools highlighted in the following sections.

With the control circuit and software tools described below, this communication system having dynamic modulation mode adjustment, and associated circuits for digital provisioning of the transmit blocks and receive blocks to use an acceptable candidate modulation format can be used for both terrestrial and subsea telecommunications deployments including both new deployments of a fiber pair without existing traffic on the fiber pair (referred to in the art as a green field deployment); and deployments to a fiber pair when traffic already exists on the fiber pair (referred to in the art as a brown field deployment). As part of this process both start of life (SOL) and end of life (EOL) max capacities should be defined. The use of the solution will also work well with systems deployed that are provided by non-original deployment vendor(s). It is also envisioned that communication systems that have legacy carriers previously deployed can use this solution however software tooling may have to incorporate an interaction penalty values of 0.5 dB of Q, for example, in the event that the legacy carriers have modulation formats, such as OOK that interfere with coherent modulation formats.

During initial deployment, all transmit blocks and receive blocks would be deployed at the maximum available transmission mode, including but not limited to a modulation format, for both the characteristics of the transmission path and taking into consideration any Q performance headroom required above the deployed mode FEC limit, i.e., a forward error correction limit of the modulation format deployed—the Q at which the deployed modulation has errors. Software tools using a combination of a degradation prediction algorithm to monitor available performance attributes affecting the transmission path (e.g., both internal and external), and circuitry to effect a change of the modulation format at the transmitter blocks and the receiver blocks. In some embodiments, the degradation prediction algorithm uses artificial intelligence and data analysis to monitor the transmission path. This combined analysis will therefore then deduce the actual effect of aging within the transmission path. In some embodiments, the software of the control circuit will send an alert that may be used to inform the system owner of an expected timescale that the modulation format will be required to be stepped down to a modulation format having a lower data rate, and the carriers and circuits affected. Using a client traffic mapping, the control circuit and software may also advise of any optical fibers that may have to be moved once a step-down mode is required. In some embodiments, should any fiber optic cable repairs occur, the control circuit will analyze the optical effect of that repair (after the cable repair occurs) and may change the modulation format to reduce the capacity of data transmitted on the fiber optic cable. In other embodiments, the control circuit may advise if a step down in the modulation format is to be performed. Whether a step down of the modulation format is to be performed or not the control circuit will analyze the optical effect of this repair and may use data indicative of the optical effect for any further mode modelling and decision making. Should the cable repair produce errors or that the control circuit has stated that a mode change is due within a set time then the user can instigate these changes via an interface. In a subsea platform pre emphasis, i.e., changing the transmitter OSNR to obtain a highest Q at the receiver, could be used prior to a mode change depending on the severity and carrier impact, i.e., the per carrier Q degradation of that change be it wet plant degradation/fiber repair etc., of the transmission change resulting from that repair. Upon instigation of the mode change all transmission required changes may be performed such as modulation format change, ASE/CW idler changes, optical and digital cross connect changes. The software within the control circuit may also state what if any fiber optic cables requires moving. For example, when a mode change is made, it is likely that the traffic on the client fiber optic cable will have to be moved to another client interface, or the client interface existing slot will have to be moved in combination with the client traffic optical fiber, or added as an additional carrier on the fiber optic cable due to any changes in client traffic mapping. When the modulation format changes total capacity will be reduced, therefore more carriers may have to be inserted on the fiber optic cable to keep the same transmission capacity already deployed. Should the impact of the modulation format change require further carriers to be placed on the fiber optic cable, the control circuit, in advance will advise of what impairment (e.g., reduction in Q) would be needed, if any, to require further carrier insertion such that capacity can be planned in advance of mode changes. Alternatively, Q margin can be increased above 0.5 dB, i.e., within a range from about 0.8 dB to 1.5 dB, for example, to reduce the time between changes in the modulation format. As all network changes are automated network outage is therefore minimized. Network changes can also be performed during any cable repairs with insertion of new carriers, if required, once cable repair is completed thereby in effect making these changes having a minimal effect on traffic.

Reference will now be made in detail to the present exemplary embodiments of the present disclosure, which are illustrated in the accompanying drawings. Wherever possible, the same reference numbers will be used throughout the drawings to refer to the same or like parts.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

The methods and systems herein disclosed may be used in optical networks. In one embodiment, the optical network has one or more band, or portion of wavelength. As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

An Optical Cross-Connect is a device for switching at least a portion of a spectrum of light in an optical signal received on an input optical port to any (one or more) output optical port. An optical cross-connect can be configured on ROADM network elements, with a built-in wavelength selective switch (WSS) component that is used to route an optical signal in any of the fiber degree or direction. For example, an exemplary optical cross connect can be formed within a wavelength selective switch by opening a specified channel, or specific spectrum of light on an input port of the wavelength selective switch. Configuring or pre-configuring an optical cross-connect may be accomplished by providing instructions to a device to cause the device to switch at least a portion of a spectrum of light in an optical signal received on an input port to any (one or more) output optical port.

As used herein, a span, or link, is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated. For example, the fiber optic cable may not be terminated at an optical in-line amplifier (described in detail below).

As used herein, a transmission line segment or transmission path is the portion of a transmission line from a first node (e.g., ROADM) transmitting a transmission signal to a second node (e.g., ROADM) receiving the transmission signal. The transmission line segment or transmission path may include one or more optical in-line amplifier situated between the first node and the second node and may include a single or multiple link(s).

Referring now to the drawings, and in particular to FIG. 1, an exemplary embodiment of subsea optical communication system 10 is illustrated therein. Subsea optical communication system 10 typically includes at least two data terminal stations 14a, 14b on land 18 and at least one optical fiber submarine cable 21 extending underwater (referred to herein as link 21), such as on the ocean floor 26, between the two data terminal stations 14a, 14b. The subsea optical communication system 10 may also include one or more in-line node 30 (FIG. 1a) between the terminal stations 14a, 14b, which may, in part, boost signals in the optical fiber submarine cable 21. The in-line node 30 may be referred to as a "repeater" that receives, amplifies, and transmits the optical signals thereby increasing a transmission range of the optical signals. Not all subsea optical communication system 10 utilize in-line node(s) 30 and the present disclosure may apply to both repeater and repeaterless systems. Although the communication system 10 is described as a subsea communication system, it should be understood that the communication system 10 can also be a terrestrial communication system.

Terminal stations 14a, 14b typically also provide transmission between the optical fiber submarine cable 21 and at least one terrestrial system 34. Two terrestrial systems 34 are shown in FIG. 1 and denoted by the reference numerals 34a and 34b. The terminal stations 14a and 14b may communicate with the terrestrial systems 34a and 34b using any suitable communication mechanism 35, such as wireless, conductive cable, fiber optic cable or the like.

The optical fiber submarine cable 21 and the one or more in-line node 30 may collectively be referred to as transmission line segment 38. In one embodiment, the optical fiber submarine cable 21 is one or more slope-matched cable, however, in another embodiment, the optical fiber submarine cable 21 is a dispersion compensated fiber having a zero-dispersion window. In one embodiment, the in-line node 30 may be a repeater or an in-line amplifier.

Optical fiber submarine cable systems are well known to those having skill in the art and are further described by the International Telecommunication Union (ITU) in its recommendations and literature, such as the following: ITU-T G.971 "General features of optical fibre submarine cable systems," ITU-T G.972 "Definition of terms relevant to optical fibre submarine cable systems," ITU-T G.973 "Repeaterless submarine systems," ITU-T G.974 "Regenerative submarine systems," and ITU-T G.977 "Optically amplified submarine systems."

Subsea optical communication system 10 typically utilizes Wavelength Division Multiplexing (WDM) such as Dense Wavelength Division Multiplexing (DWDM). Dense Wavelength Division Multiplexing multiplexes multiple optical carrier signals, such as Optical Channel signals or Super-Channel signals, onto a single optical fiber by using different laser light wavelengths.

In subsea optical communication system 10, one or more optical data carrier signal 42 may be transmitted in one or more optical data channel 46 through the optical fiber submarine cable 21. The subsea optical communication system 10 may be in constant power in order to transmit for long distances with low noise. To be able to operate optical data channels 46 through the subsea optical communication system 10 at a lower power than the constant power, one or more idler signal 50 in one or more idler channel 54 may also be transmitted. The idler channel(s) 54 are transmitted at different frequencies than the optical data channels 46. The idler channel 54 "soaks up" the unwanted power not used by the optical data channels 46 so that the optical data channels 46 may operate at the correct power. For example, idler channel(s) 54 may be used to lower the subsea optical communication system 10 optical power in legacy subsea repeater systems which are designed for higher optical power 10G legacy channels.

Figure 1A:
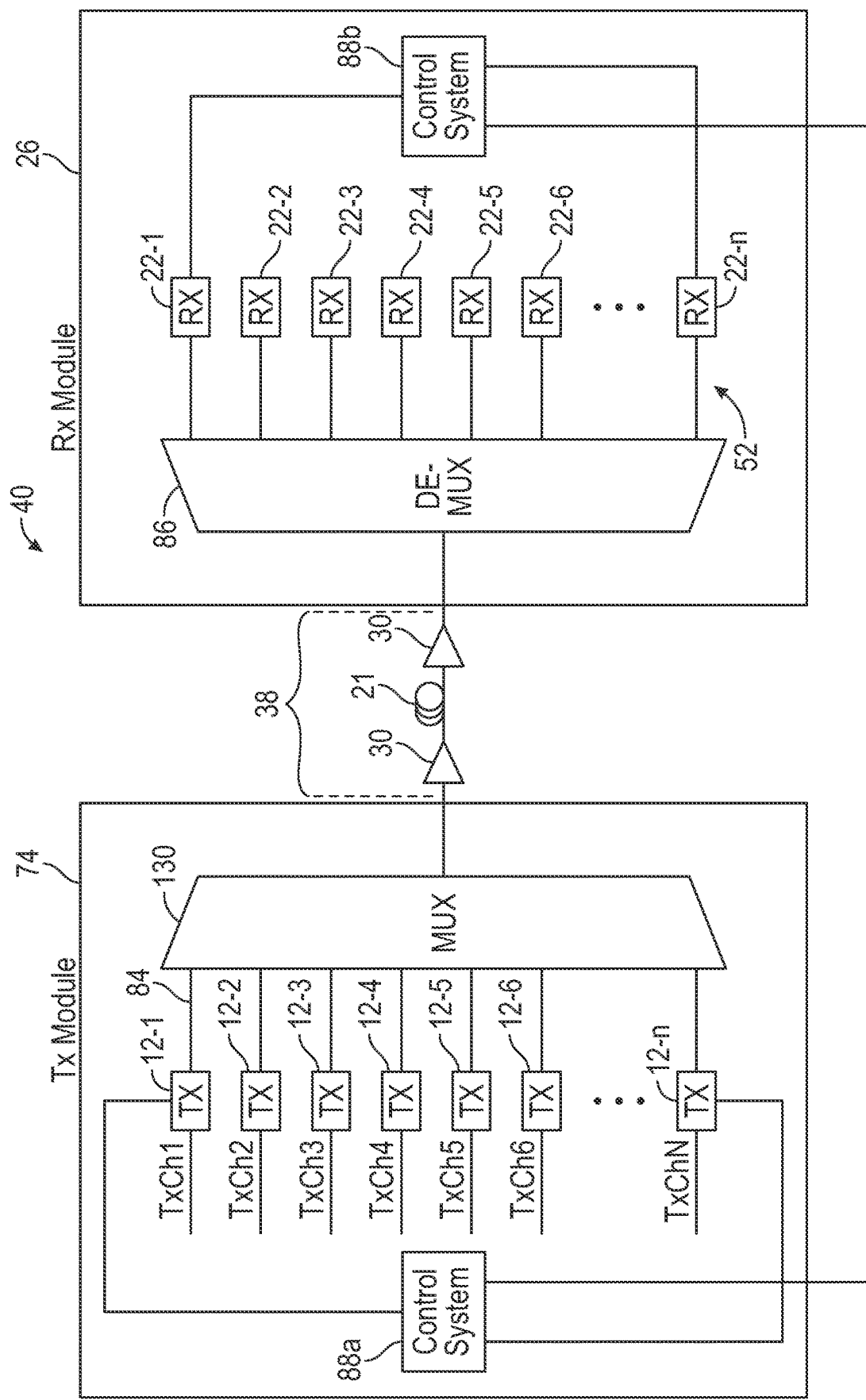
FIG. 1*a* is a block diagram of an exemplary coherent optical transport system in accordance with the present disclosure.

Referring now to FIG. 1a is a block diagram of an exemplary embodiment of an optical mesh network 40 of the communication system 10 in which systems and/or methods, described herein, may be implemented. While FIG. 1a shows a particular configuration of components, in practice, the communication system 10 may include additional components, different components, or differently arranged components than what are shown in FIG. 1a. Also, in some instances, one of the components illustrated in FIG. 1a may perform a function described herein as being performed by another one of the components illustrated in FIG. 1a. The subsea optical communication system 10 may include additional components such as more than one optical fiber submarine cable 21, and more than two repeaters 30. The optical mesh network 40 includes one or more optical transmitter module 74 (referred to hereinafter as optical transmitter module) and one or more optical receiver module 78 (referred to hereinafter as optical receiver module). For instance, the optical transmitter module 74 and the optical receiver module 78 may be incorporated in the terminal station 14a or the terminal station 14b.

The optical mesh network 40 may be part of a wavelength division multiplexed (WDM) subsea optical communication system 10. The components in the subsea optical communication system 10 may support communications over a number of wavelength channels.

As illustrated in FIG. 1a, the optical mesh network 40 may include the optical transmitter module 74 (e.g., a Tx PIC) and/or the optical receiver module 78 (e.g., an Rx PIC). In some implementations, optical transmitter module 74 may be optically connected to optical receiver module 78 via the transmission line segment 38, having at least one link 21, and/or in-line node 30. The transmission line segment 38 may include at least one in-line node 30 that amplifies the optical data carrier signal 42 as the optical data carrier signal 42 is transmitted over transmission line segment 38 from the optical transmitter module 74 to the optical receiver module 78.

In use, the optical transmitter module 74 may modulate a phase of the optical data carrier signal 42 in order to convey data (via the optical data carrier signal 42) to the optical receiver module 78 where the optical data carrier signal 42 may be demodulated, such that data, included in the optical data carrier signal 42, may be recovered. An m-quadrature amplitude modulation format may be used to modulate the input signal. Exemplary m values=256, 128, 64, 32, 16, 8 and 4. In some embodiments, the m value is at least 16. As m goes down in value, the input signal can be transmitted farther without introducing unacceptable errors in the link 21. Further, using a technique known as probablistic shaping for any of the m values greater than 16 can increase the transmission distance without introducing unacceptable errors in the link 21. Different modulation formats correspond to different distances that the input signal may be transmitted. Further, different modulation formats may result in different bit error rates (BERs) associated with the optical data carrier signal 42.

In the m-quadrature amplitude modulation formats, the polarization of the optical data carrier signal 42 may be used to modulate the optical data carrier signal 42. Polarization is the direction of the electric field in the lightwave. If the electric field of the lightwave is in the Y Axis, the light is said to be vertically polarized. If the electric field of the lightwave is in the X axis, the light is said to be horizontally polarized. Additionally, the amplitude and the phase of the optical signal may be modulated. There may be an in-phase component (I) of the optical signal proportional to the cosine of the phase shift and a quadrature component (Q) proportional to the sine of the phase shift of the optical signal. Here, "I" and "Q" denote the real and imaginary components of the X and Y polarizations. Therefore, the optical data carrier signal 42 has four (4) analog streams corresponding to the four (4) degrees of freedom of the optical field: XI, XQ, YI, and YQ. When the optical data carrier signal 42 is split into subcarriers, these four (4) analog streams contain the optical field of all the subcarriers combined.

Optical transmitter module 74 may include a number of optical transmitter blocks 12-1 through 12-n (where n is greater than or equal to 1), waveguides 84, and/or optical multiplexer 130. Each optical transmitter block 82 may receive a data channel (TxCh1 through TxChN), modulate the data channel with an optical signal, and transmit the data channel as an optical signal. In one implementation, optical transmitter module 74 may include 5, 10, 20, 50, 100, or some other number of optical transmitter blocks 12-1-12-N. Each optical transmitter 12 may be tuned to use an optical carrier of a designated wavelength, and may be further tuned to provide subcarriers as discussed below. It may be desirable that the grid of wavelengths emitted by transmitter blocks 12 conform to a known standard, such as a standard published by the Telecommunication Standardization Sector (ITU-T).

The optical mesh network 40 may also include one or more control system 88 for controlling the m-quadrature amplitude modulation format utilized by the transmitter blocks 12 and/or the receiver blocks 22. Shown in FIG. 1a by way of example are two control systems 88 which are designed by the reference numerals 88a and 8b. In general, the control system 88 analyzes performance data of a link carrying data, generated by one of the transmitter blocks 12-1-12-n of the first terminal station 14a, towards one of the receiver blocks 22-1-22-n of the second terminal station 14b with a degradation prediction algorithm to determine a predicted level of degradation of at least a portion of the link 21 over time, the data being encoded in a first m-quadrature amplitude modulation format. The link 21 being an uninterrupted segment of fiber optic cable. The control system 88 then provides first control signals to at least one of the transmitter blocks 12-1-12-n of the first terminal station 14a, and second control signals to at least one of the receiver blocks 22-1-22-n of the second terminal station 14b based upon the predicted level of degradation of the link 21 over time. The first control signals causing the transmitter block 12-1, for example, to encode data to be transmitted over the link in a second m-quadrature amplitude modulation format having a lower data rate than the first m-quadrature amplitude modulation format. The second control signals cause the receiver block 22-1, for example, to decode data received from the link 21 using the second m-quadrature amplitude modulation format. In the example shown, either one of the control systems 88a and 88b can determine the predicted level of degradation as discussed herein. In the example shown, the control system 88a communicates with the transmitter blocks 12-1-12-n to provide the first control signal to at least one of the transmitter blocks 12-1-12-n, and the control system 88b communicates with the receiver blocks 22-1-22-n. The control systems 88a and 88b can be collectively referred to herein as the control system.

Figure 1B:
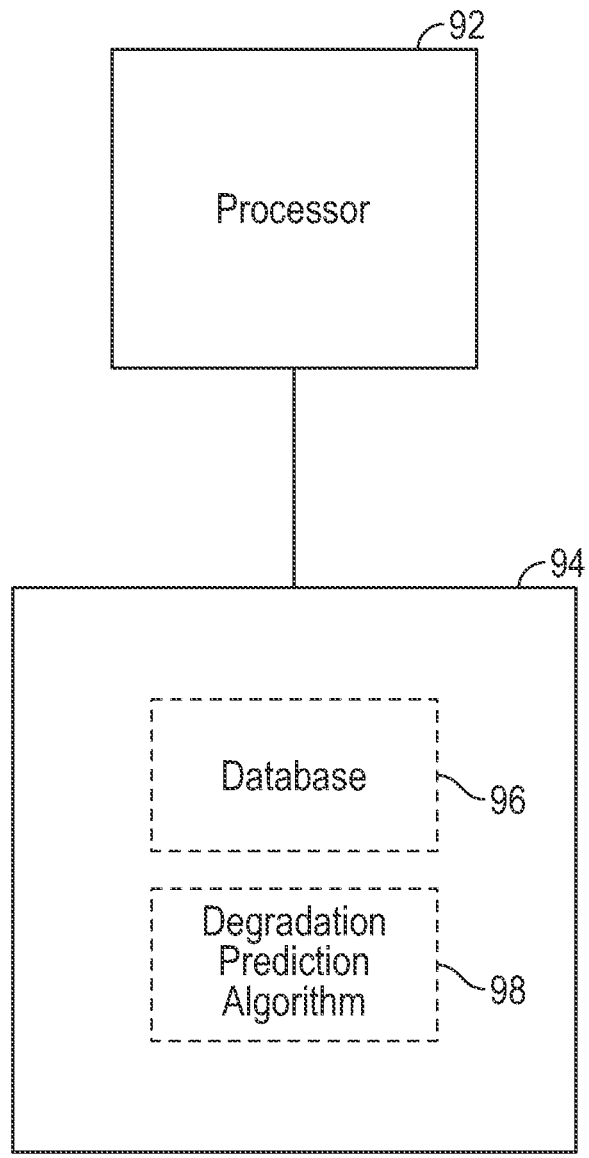
FIG. 1*b* is a block diagram of an exemplary control circuit constructed in accordance with the present disclosure.

Referring to FIG. 1b, shown therein is a block diagram of an exemplary embodiment of the control system 88. The control system 88 is provided with a processor 92 and at least one non-transitory computer readable medium 94 coupled to the processor 92. The non-transitory computer readable medium 94 stores a link database 96, and a degradation prediction algorithm 98. The link database 96 is continuously (e.g., at intervals such as every 15 minutes) populated with performance data associated with the link 21, and each such population of the performance data is time-stamped so that performance trends over time can be analyzed. The performance data may include one or more performance attribute. Exemplary performance attributes include Q-factor, Optical Signal to Noise ratio, repeater input (received light level (RLL), i.e., the light level in dBm into each repeater), output send light level (SLL), i.e., total output optical power of each repeater, data from a Wet Plant Line Monitoring (WPLM) unit, repeater gain changes and associated impact on timelines can also be derived. WPLM is a device that sends commands to the repeaters 30 and receives performance attributes from the repeaters 30. Further performance attributes include a repeater gain change, which may be used to compensate for inter span fiber degradation. Repeater gain change values may be −1, nominal and nominal +1. The repeater gain change may be changed manually and entered into the link database, or the degradation prediction algorithm may estimate the repeater gain change value by determining an increase in output power in relation to the repeater input power. Other performance attributes include per carrier OSNR, per carrier Q factor, all system interface TX and RX optical powers, power feed equipment (PFE) voltage and currents, repeater bias currents where applicable, repair indication and location of that repair. Age of any particular fiber optic cable may not be a requirement, but initial measured performance attributes of the fiber optic cable may be considered as start of life performance attributes.

The processor 92 runs the degradation prediction algorithm 98 continuously and/or at intervals to determine the predicted level of degradation of one or more links or spans, such as the link 21 or the span 38, over time. The predicted level of degradation over time is then used to determine one or more instants of time (e.g., day) when the capacity of the link 21 or span 38 is projected to need to be reduced so as to avoid errors above a threshold occurring within the link 21.

When the predicted level of degradation over time merits a reduction in the capacity of the link 21 to avoid errors occurring within the link 21, for example, the degradation prediction algorithm 98 causes the processor 92 to output the first control signal(s) to the transmitter block(s) 12-1-12-n, and the second control signal(s) to the receiver blocks(s) 22-1-22-n.

In some embodiments, the degradation prediction algorithm 98 uses machine learning algorithms, based on artificial intelligence to analyze the performance data within the link database 96. With machine learning, the goal is to train a computer system to identify patterns within the link database 96 indicative of degradation of the link 21, or devices associated with the link 21, such as the terminal stations 14a and 14b, or the repeaters 30. Exemplary types of artificial intelligence algorithms can be used, such as a convolutional neural network. The utilization of neural networks in machine learning is known as deep learning.

To train the artificial intelligence, data from performance data from existing telecommunication networks can be analyzed and labeled with degradation parameters indicative of degrees of degradation to permit the artificial intelligence to generate statistical correlations between various types of data and certain types of degradation. The learned statistical correlations are then applied to new data within the link database 96 to predict degradation on particular components, links and the like.

Convolutional neural networks (CNN) are machine learning models that have been used to perform artificial intelligence correlations.

Another type of artificial intelligence that can be used are Generative adversarial networks (GANs). GANs are neural network deep learning architectures comprising two neural networks and pitting one against the other. One neural network, called a Generator, generates new data instances, while another neural network, called a Discriminator, evaluates the new data instances for authenticity, that is, the Discriminator decides whether each data instance belongs to the training data set or not. The creation of a generative adversarial network is explained, for example, in "Generative Adversarial Networks," by Goodfellow, et al (Departement d'informatique et de recherche operationnelle Universite de Montreal, June 2014).

When using computer-based supervised deep learning techniques, such as with a CNN, a user provides a series of examples of performance attribute data to the computer system and the computer system uses a network of equations to "learn" significant correlations for the object of interest, in this case degradation.

Figure 2:
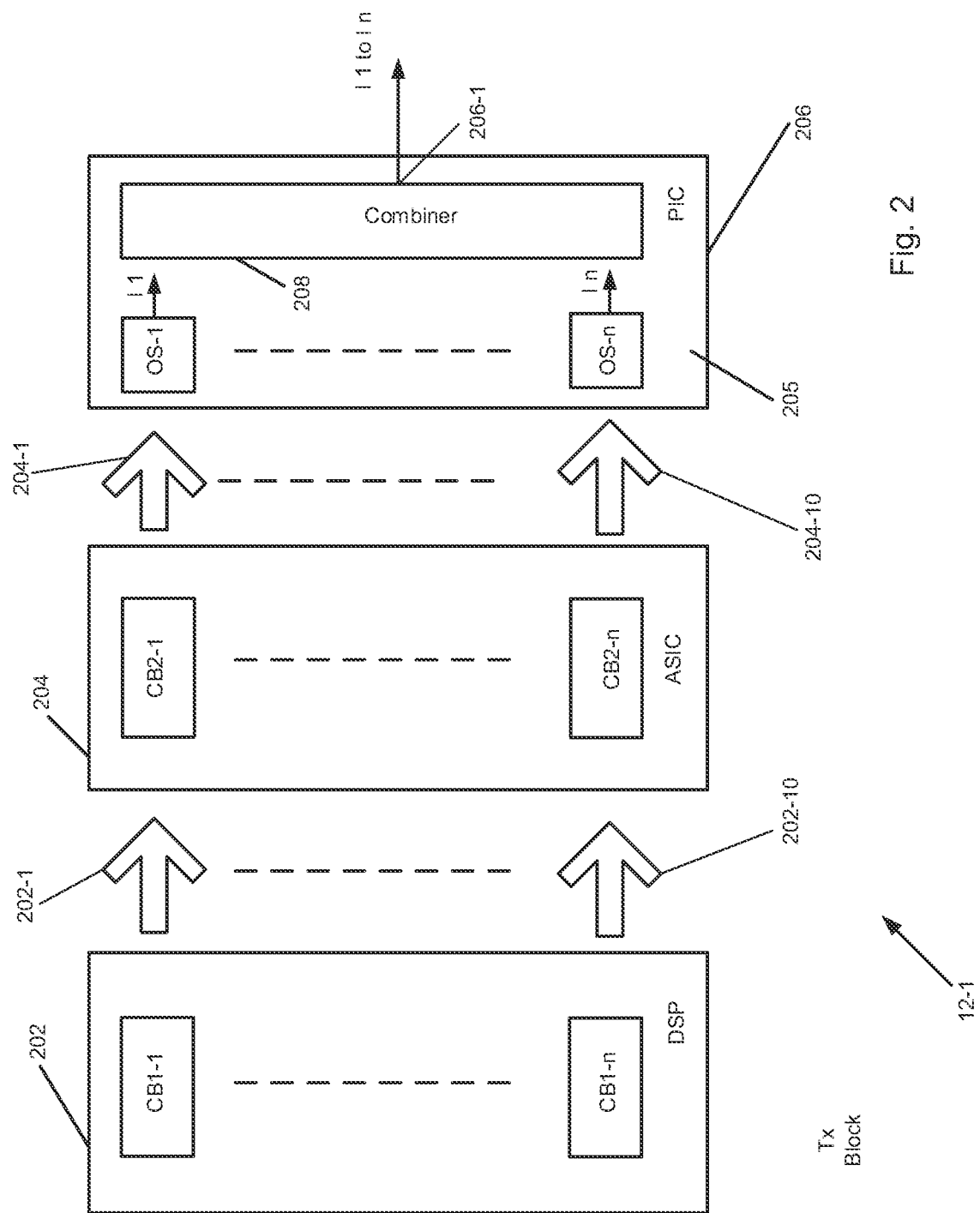
FIG. 2 illustrates a diagram of a transmit block, including a transmission circuit, consistent with an additional aspect of the present disclosure.

FIG. 2 illustrates one of the transmitter blocks 12-1 in greater detail. Transmitter block 12-1 may include a digital signal processor (DSP) 202 including circuitry or circuit blocks CB1-1 to CB1-n, each of which receiving, for example, a corresponding portion of Data-1 (first data) during a first time interval and second data during a second time interval, and supplying a corresponding one of outputs or electrical signals 202-1 to 202-n (including but not limited to first digital signals based on the first data and second digital signals based on the second data) to a circuit, such as application specific integrated circuit (ASIC) 204. ASIC 204 include circuit blocks CB2-1 to CB2-n, which supply corresponding outputs or electrical signals 204-1 to 204-n to optical sources or transmitters OS-1 to OS-2 provided on transmit photonic integrated circuit (PIC) 205. As further shown in FIG. 2, each of optical sources OS-1 to OS-2 supplies a corresponding one of modulated optical signals having wavelengths λ1 to λ10, respectively. The optical signals are combined by an optical combiner or multiplexer, such as arrayed waveguide grating (AWG) or power combiner 208, for example, and combined into a band or group of optical signals supplied by output 206-1. Optical sources OS-1 to OS-n and multiplexer 208 may be provided on substrate 205, for example. Substrate 205 may include indium phosphide or other semiconductor materials. It is understood, that optical sources OS-1 to OS-n, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices. In addition, components and/or devices in each of circuit blocks CB1, CB2, and optical sources OS and combiner 208 may be integrated with one or more of such components and/or devices or may be provided as discrete devices or components.

DSP 202 and ASIC 204 may collectively constitute a transmission circuit that supplies drive signals (electrical signals) to the modulators in optical source OS-1 as well as the remaining optical sources.

Figure 3:
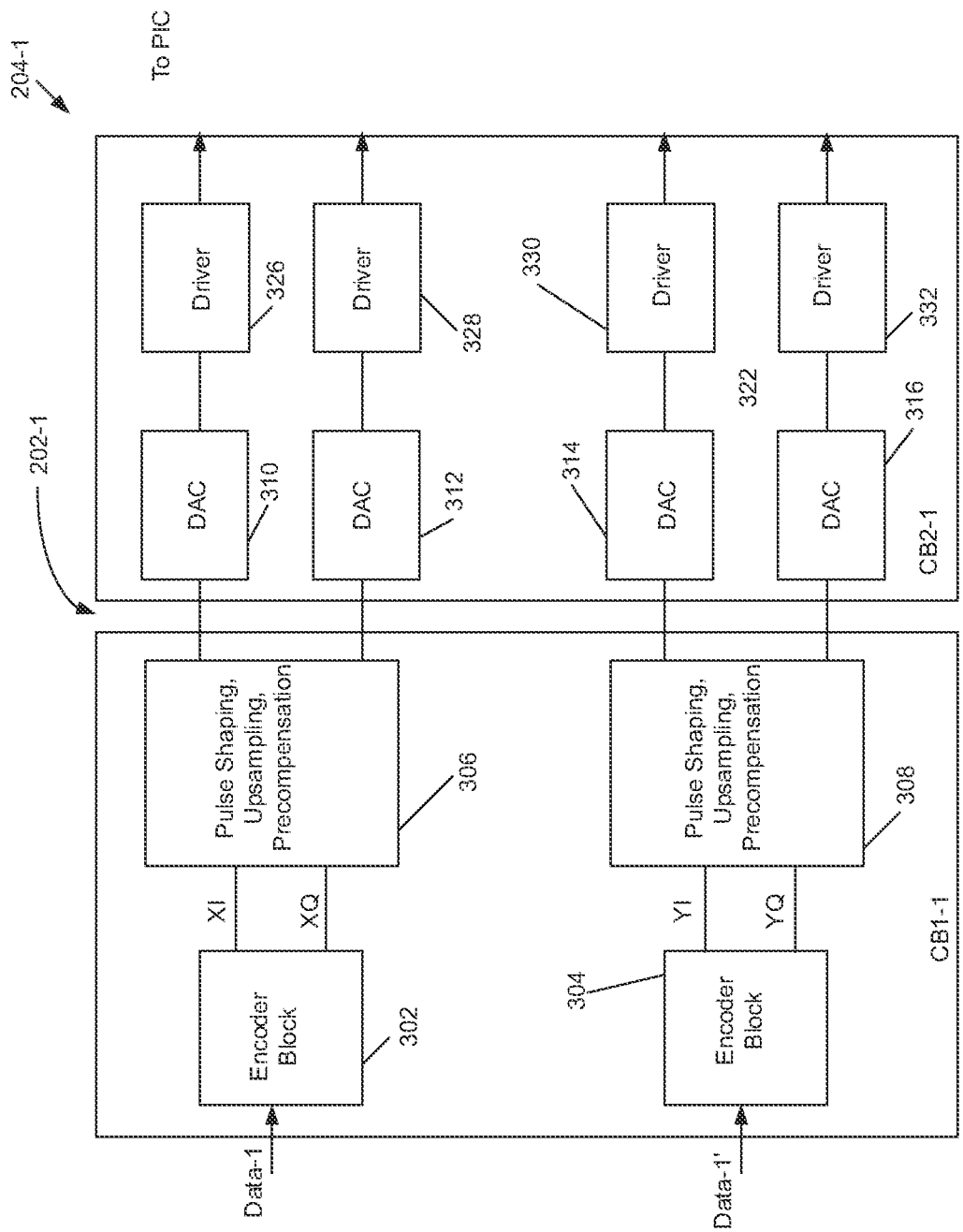
FIG. 3 illustrates features of a digital signal processor and application specific integrated circuit consistent with an aspect of the present disclosure.

FIG. 3 illustrates a portion of transmitter blocks 12, namely, circuit blocks CB1-1 of DSP 202 and DB2-1 of ASIC 204 in greater detail. Circuit block CB-1 includes an encoder block 302 that supplies in-phase (XI) and quadrature (XQ) symbols for modulating the X (or transverse electric—TE) polarization of the transmitted optical signal.

Figure 4A:
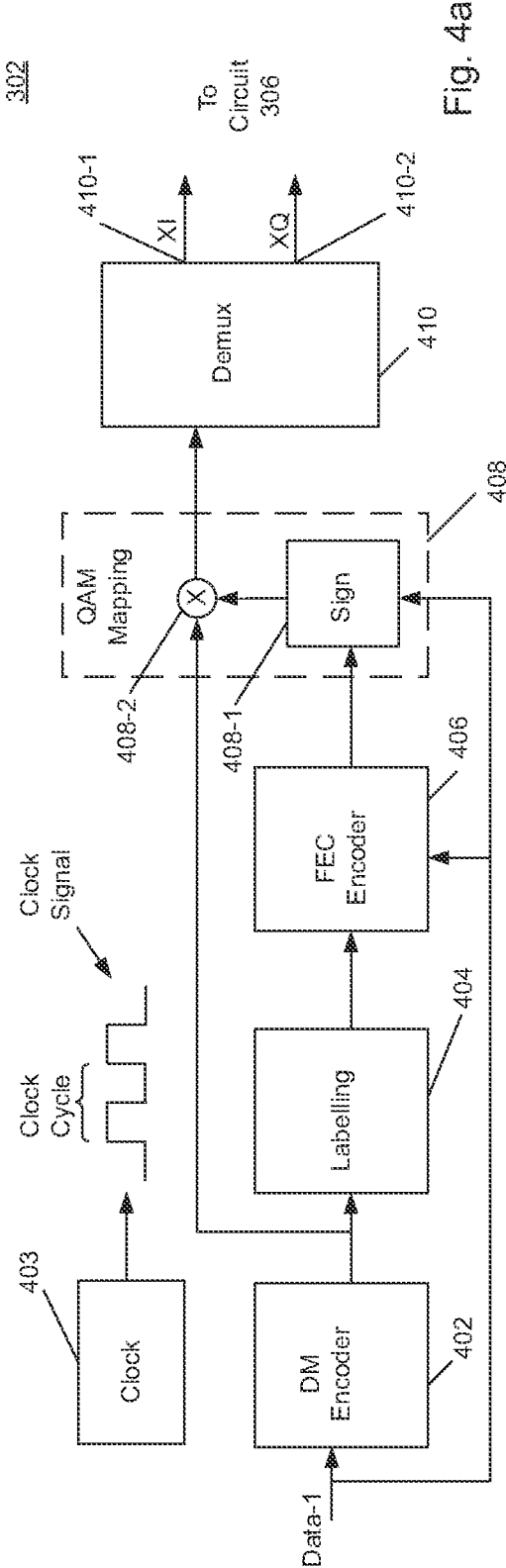
FIGS. 4*a* and 4*b* illustrate features of an encoder circuit consistent with a further aspect of the present disclosure.

Encoder block 302 is shown in greater detail in FIG. 4a. As shown in FIG. 4a, Encoder block 302 include distribution matching (DM) encoder 402 that may receive input bit sequences Data-1, each having a length of k-bits, and supply codewords, each having n symbols, to a labelling circuit 404. Each symbol of the codeword corresponds to an amplitude of a constellation point of a transmitted symbol on the real or imaginary axes (I or Q signal components). As discussed in greater detail below, DM encoder 402 outputs a codeword symbol during each clock cycle of the clock signal output from clock circuit 403, such that a codeword is output from DM encoder 402 after n clock cycles based on fixed-point operations or fixed-point representations of the input data sequence. Labelling circuit 404 assigns each symbol of the codeword a unique binary label suitable for Gray coding the label may also be non-binary. The binary or non-binary labels are next supplied to a forward error correction encoder circuit 406, which provides encoded symbols based on the received labels and the input data sequence. The encoded symbols are next fed to a quadrature amplitude modulation (QAM) mapper circuit 408, which includes a sign circuit 408-1 and a multiplier 408-2. Sign circuit 408-1 determines a sign of the I and Q symbols for identifying a particular quadrant of the constellation in which a point associated with a particular transmitted symbol is located. Such location is determined based on the received encoded symbols and input sequence. The sign information output from sign circuit 408-1 is provided to multiplier 408-2, which multiplies each symbol of each codeword by the sign information to generate, in one example, a stream of alternating in-phase and quadrature symbols. Demultiplexer 410 receives the stream of in-phase and quadrature symbols and supplies the in-phase symbols (XI) at a first output 410-1 and the quadrature symbols (XQ) at a second output 410-2.

It is noted that encoder block 304 shown in FIG. 3 has the same or similar structure as encoder 302 but provides in-phase (YI) and quadrature (YQ) symbols for modulating the Y (or transverse magnetic—TM) component of the transmitted optical signal.

Figure 4B:
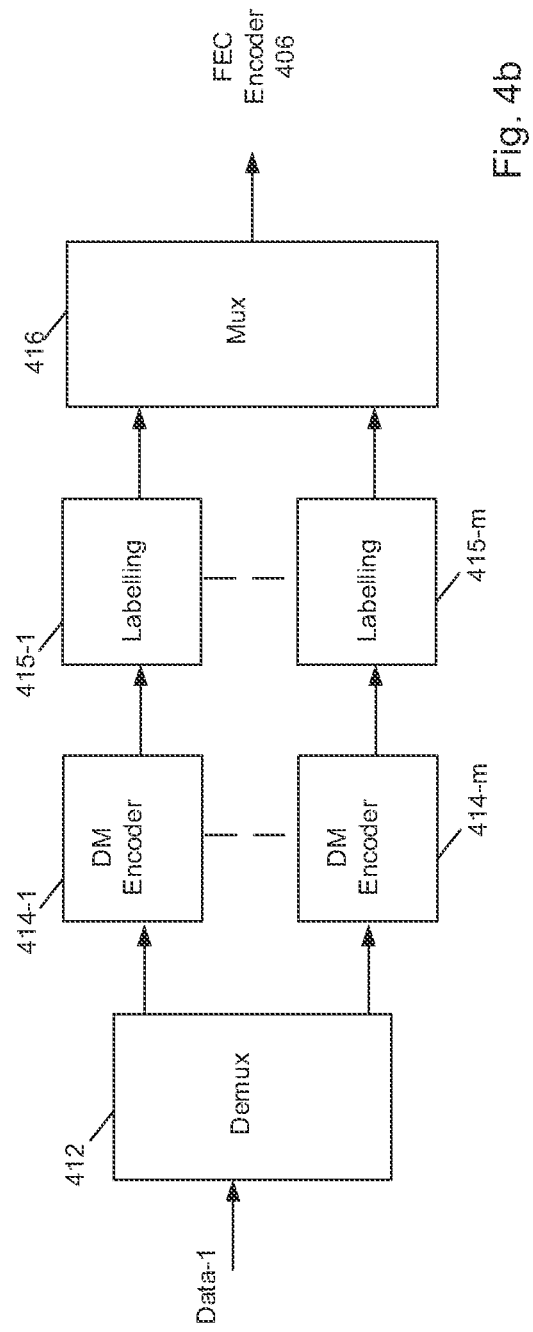

FIG. 4b shows an alternative implementation of a DM encoder having a parallel structure. Here the input sequence is supplied to a demultiplexer 412 which supplies input data segments to each of DM encoder 414-1 to 414-m having the same or similar structure as DM encoder 402. Each of DM encoder 414-1 to 414-m may output a separate codeword, for example, to a corresponding one of labelling circuits 415-1 to 415-m, which in turn, supply labels to multiplexer 416. Multiplexer 416 may multiplex the labels associated with each codeword, which may be subject to the processing noted above with respect to FIG. 4a to generate symbols XI, XQ, YI, and YQ. The circuitry shown in FIG. 4a may be employed to calculate relatively long codewords of arbitrary length and including arbitrary alphabets, such as codewords having a length approximately equal to a thousand symbols, in one example.

Returning to FIG. 3, outputs XI and XQ are provided to pulse shaping, upsampling, and precompensation circuitry 306, which in turn, supplies outputs to digital to analog converters (DACs) 310 and 312. Similarly, outputs Yi and YQ are provided to pulse shaping, upsampling, and precompensation circuitry 308, which similarly supplies outputs to DACs 314 and 316.

As further shown in FIG. 3, DACs 310/312 and 314/316 output corresponding analog signals, e.g., first analog signals based on the first digital signals and second analog signals based on the second digital signals, which are filtered by low-pass or roofing filters (not shown) to thereby remove, block or substantially attenuate higher frequency components in these analog signals. Such high frequency components or harmonics are associated with sampling performed by DACs 310/312, 314/316 and are attributable to known "aliasing." The filtered analog signals may next be fed to corresponding driver circuits 326/328 and 332/330, which supply modulator driver signals, e.g., first drive signals based on the first analog signals, and second analog signals based on the second analog signals, that have a desired current and/or voltage for driving modulators present in PIC 206 (or provided as discrete devices) to provide modulated optical signals having the symbol probability distributions noted above.

Optical source OS-1 on PIC 206 will next be described with reference to FIG. 5. It is understood that remaining optical sources OS-1 to OS-n have the same or similar structure as optical source OS-1.

Optical source OS-1 may be provided on substrate 205 and may include a laser 508, such as a distributed feedback laser (DFB) that supplies light to at least four (4) modulators 506, 512, 526 and 530. DFB 508 may output continuous wave (CW) light at wavelength λ1 to a dual output splitter or coupler 510 (e.g. a 3 db coupler) having an input port and first and second output ports. Typically, the waveguides used to connect the various components of optical source OS-1 may be polarization dependent. A first output 510a of coupler 510 supplies the CW light to first branching unit 511 and the second output 510b supplies the CW light to second branching unit 513. A first output 511a of branching unit 511 is coupled to modulator 506 and a second output 511b is coupled to modulator 512. Similarly, first output 513a is coupled to modulator 526 and second output 513b is coupled to modulator 530. Modulators 506, 512, 526 and 530 may be, for example, Mach Zehnder (MZ) modulators. Each of the MZ modulators receives CW light from DFB 508 and splits the light between two (2) arms or paths. An applied electric field in one or both paths of a MZ modulator creates a change in the refractive index to induce phase and/or amplitude modulation to light passing through the modulator. Each of the MZ modulators 506, 512, 526 and 530, which collectively can constitute a nested modulator, are driven with data signals or drive signals supplied via driver circuits 326, 328, 330, and 332, respectively. The CW light supplied to MZ modulator 506 via DFB 508 and branching unit 511 is modulated in accordance with the drive signal supplied by driver circuit 326. The modulated optical signal from MZ modulator 506 is supplied to first input 515a of branching unit 515. Similarly, driver circuit 328 supplies further drive signals for driving MZ modulator 512. The CW light supplied to MZ modulator 512 via DFB 508 and branching unit 511 is modulated in accordance with the drive signal supplied by driver circuit 328. The modulated optical signal from MZ modulator 512 is supplied to phase shifter 514 which shifts the phase of the signal 90° (π/2) to generate one of an in-phase (I) or quadrature (Q) components, which is supplied to second input 515b of branching unit 515. The modulated data signals from MZ modulator 506, which include the remaining one of the I and Q components, and the modulated data signals from MZ modulator 512, are supplied to polarization beam combiner (PBC) 538 via branching unit 515.

Modulators 506, 512, 526, and 530 may be individually or collectively referred to herein as a "modulator".

Modulator driver 330 supplies a third drive signal for driving MZ modulator 526. MZ modulator 526, in turn, outputs a modulated optical signal as either the I component or the Q component. A polarization rotator 524 may optionally be disposed between coupler 510 and branching unit 513. Polarization rotator 524 may be a two port device that rotates the polarization of light propagating through the device by a particular angle, usually an odd multiple of 90°. The CW light supplied from DFB 508 is rotated by polarization rotator 524 and is supplied to MZ modulator 526 via first output 513a of branching unit 513. MZ modulator 526 then modulates the polarization rotated CW light supplied by DFB 508, in accordance with drive signals from driver circuit 330. The modulated optical signal from MZ modulator 526 is supplied to first input 517a of branching unit 517.

A fourth drive signal is supplied by driver 332 for driving MZ modulator 530. The CW light supplied from DFB 508 is also rotated by polarization rotator 524 and is supplied to MZ modulator 530 via second output 513b of branching unit 513. MZ modulator 530 then modulates the received optical signal in accordance with the drive signal supplied by driver 432. The modulated data signal from MZ modulator 530 is supplied to phase shifter 528 which shifts the phase the incoming signal 90° (π/2) and supplies the other of the I and Q components to second input 517b of branching unit 517. Alternatively, polarization rotator 536 may be disposed between branching unit 517 and PBC 538 and replaces rotator 524. In that case, the polarization rotator 536 rotates both the modulated signals from MZ modulators 526 and 530 rather than the CW signal from DFB 508 before modulation. The modulated data signal from MZ modulator 526 is supplied to first input port 538a of polarization beam combiner (PBC) 538. The modulated data signal from MZ modulator 530 is supplied to second input port 538b of polarization beam combiner (PBC) 538. PBC 538 combines the four modulated optical signals from branching units 515 and 517 and outputs a multiplexed optical signal having wavelength λ1 to output port 538c. In this manner, one DFB laser 508 may provide a CW signal to four separate MZ modulators 506, 512, 526 and 530 for modulating at least four separate optical channels by utilizing phase shifting and polarization rotation of the transmission signals. Although rotator 536 and PBC 538 are shown on the PIC, it is understood that these devices may instead be provided off-PIC.

In another example, splitter or coupler 510 may be omitted and DFB 508 may be configured as a dual output laser source to provide CW light to each of the MZ modulators 506, 512, 526 and 530 via branching units 511 and 513. In particular, coupler 510 may be replaced by DFB 508 configured as a back facet output device. Both outputs of DFB laser 508, from respective sides 508-1 and 508-2 of DFB 508, are used, in this example, to realize a dual output signal source. A first output 508a of DFB 508 supplies CW light to branching unit 511 connected to MZ modulators 506 and 512. The back facet or second output 508*b* of DFB 508 supplies CW light to branching unit 513 connected to MZ modulators 526 and 530 via path or waveguide 543 (represented as a dashed line in FIG. 5*a*). The dual output configuration provides sufficient power to the respective MZ modulators at a power loss far less than that experienced through 3 dB coupler 510. The CW light supplied from second output 508*b* is supplied to waveguide 543 which is either coupled directly to branching unit 513 or to polarization rotator 524 disposed between DFB 508 and branching unit 513. Polarization rotator 524 rotates the polarization of CW light supplied from second output 508*b* of DFB 508 and supplies the rotated light to MZ modulator 526 via first output 513*a* of branching unit 513 and to MZ modulator 530 via second output 513*b* of branching unit 513. Alternatively, as noted above, polarization rotator 524 may be replaced by polarization rotator 536 disposed between branching unit 517 and PBC 538. In that case, polarization rotator 536 rotates both the modulated signals from MZ modulators 526 and 530 rather than the CW signal from back facet output 508*b* of DFB 508 before modulation.

As noted above, the modulated optical signals output from each of modulators 506, 512, 526, and 530 carry modulation symbols that are carried by the modulated optical signals in accordance with a transmission probability distribution in accordance with a corresponding codeword(s) output from the DM encoder(s). Each of the modulated optical signals, therefore, may have a desired SE.

In some embodiments, the modulator is operable to provide a first modulated optical signal based on the first drive signals referred to above, and the first optical signal. The first modulated optical signal includes a first plurality of optical subcarriers. One of the first plurality of subcarriers carries a first sequence of modulation symbols, such that the first sequence of modulation symbols includes first modulation symbols and second modulation symbols. The first modulation symbols being transmitted more frequently than the second modulation symbols in accordance with a first transmission probability distribution. The modulator further being operable to provide a second modulated optical signal based on the second drive signals. The second modulated optical signal including a second plurality of optical subcarriers, one of the second plurality of optical subcarriers carries a second sequence of modulation symbols, such that the second sequence of modulation symbols includes third modulation symbols and fourth modulation symbols, the third modulation symbols being transmitted more frequently than the fourth modulation symbols in accordance with a second transmission probability distribution.

As noted above, optical signals output from transmitter block 12-1 are combined with optical signals output from remaining transmitter blocks 12-2 to 12-*n* via the multiplexer 130 onto transmission line segment 38 and transmitted to optical receiver module 78 (see FIG. 1*a*). In optical receiver module 78, demultiplexer 86 divides the incoming signals into optical signal groupings, such that each grouping is fed to a corresponding one of receiver blocks 22-1 to 22-*n*.

Figure 6:
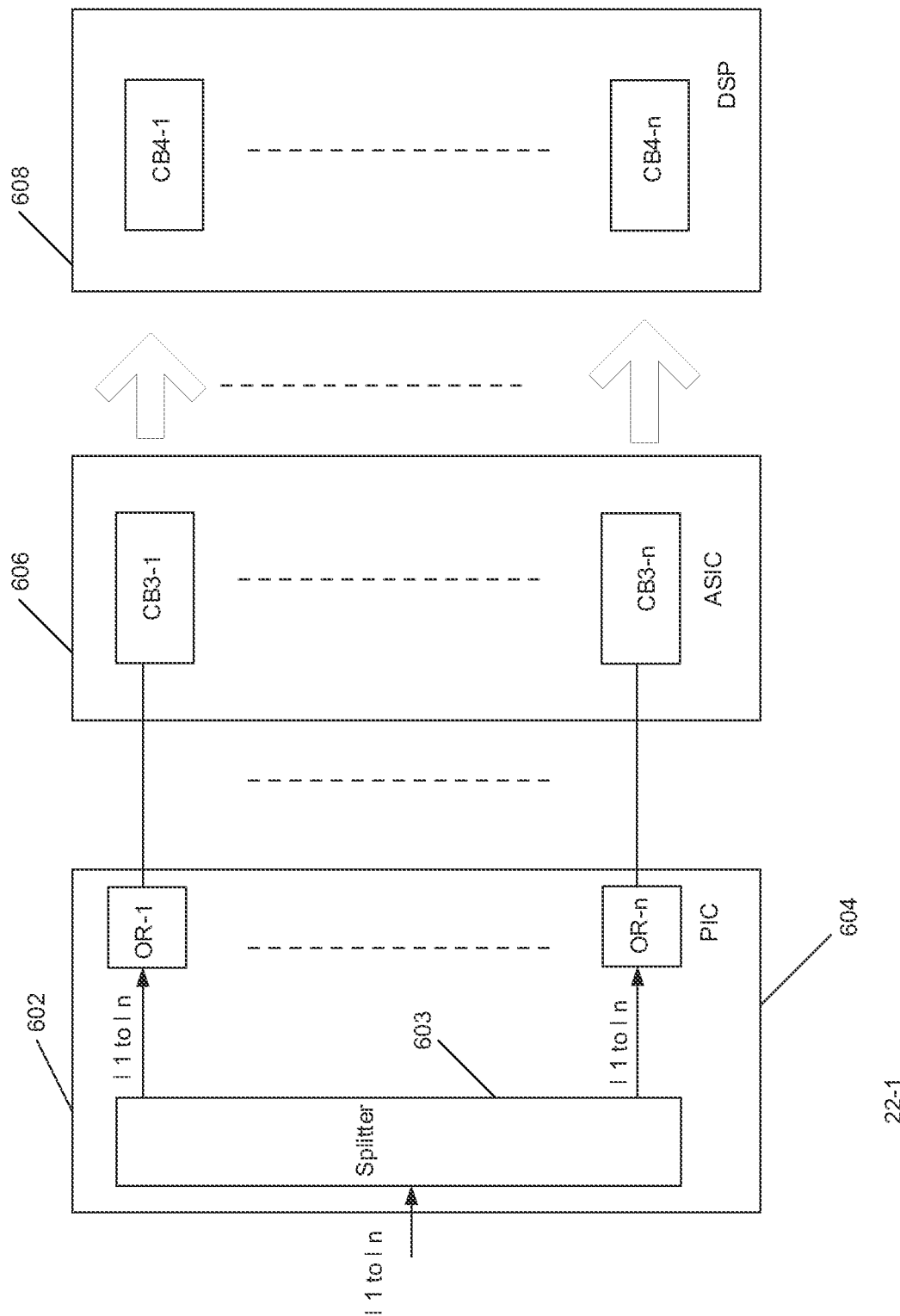
FIG. 6 illustrates a block diagram of a receive block consistent with an aspect of the present disclosure.

One of receiver blocks 22-1 is shown in greater detail in FIG. 6. It is understood that remaining receiver circuitry or blocks 22-2 to 22-*n* have the same or similar structure as receiver block 22-1.

Receiver block 22-1 includes a receive PIC 602 provided on substrate 604. PIC 602 includes an optical power splitter 603 that receives optical signals having wavelengths $\lambda 1$ to $\lambda 10$, for example, and supplies a power split portion of each optical signal (each of which itself may be considered an optical signal) to each of optical receivers OR-1 to OR-n. Each optical receiver OR-1 to OR-n, in turn, supplies a corresponding output to a respective one of circuit blocks CB3-1 to CB3-*n* of ASIC 606, and each of circuit blocks CB3-1 to CB3-*n*, supplies a respective output to a corresponding one of circuit blocks CB4-1 to CB4-*n* of DSP 608. DSP 608, in turn, outputs a copy of data Data-1 in response to the input to circuit blocks CB4-1 to CB4-*n*.

Figure 7:
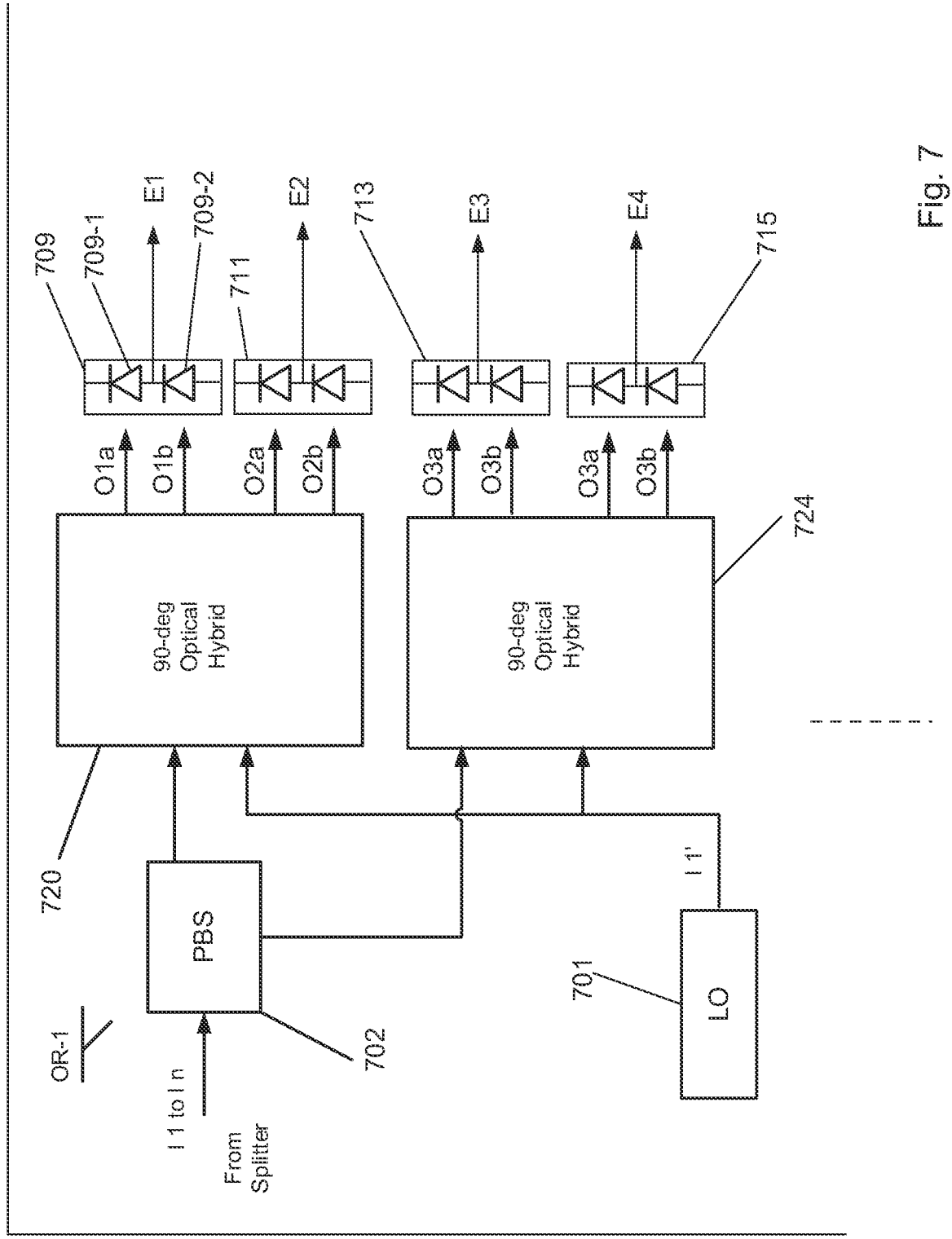
FIG. 7 illustrates a portion of a receiver photonic integrated circuit consistent with the present disclosure.

Optical receiver OR-1 is shown in greater detail in FIG. 7. It is understood that remaining optical receivers OR-2 to OR-n have the same or similar structure as optical receiver OR-1. Optical receiver OR-1 may include a polarization beam splitter (PBS) 702, which may be provided on or off substrate 604 operable to receive polarization multiplexed optical signals $\lambda 1$ to $\lambda 10$ and to separate the signal into X and Y orthogonal polarizations, i.e., vector components of the optical E-field of the incoming optical signals transmitted on optical communication path 16. The orthogonal polarizations are then mixed in 90-degree optical hybrid circuits ("hybrids") 720 and 724 with light from local oscillator (LO) laser 701 having wavelength $\lambda 1$ or a wavelength that differs slight from wavelength $\lambda 1$ so that the incoming light "beats" with the local oscillator light. Hybrid circuit 720 outputs four optical signals O1*a*, O1*b*, O2*a*, O2*b* and hybrid circuit 724 outputs four optical signals O3*a*, O3*b*, O4*a*, and O4*b*, each representing the in-phase and quadrature components of the optical E-field on X (TE) and Y (TM) polarizations, and each including light from local oscillator 701 and light from polarization beam splitter 702. Optical signals O1*a*, O1*b*, O2*a*, O2*b*, O3*a*, O3*b*, O4*a*, and O4*b* are supplied to a respective one of photodetector circuits 709, 711, 713, and 715. Each photodetector circuit, for example, may include a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or single-ended photodiode. Electrical signals E1 to E4 are indicative of data carried by optical signals $\lambda 1$ to $\lambda 10$ input to PBS 702 demodulated with LO 701 ($\lambda 1$). For example, these electrical signals may comprise four base-band analog electrical signals linearly proportional to the in-phase and quadrature components of the optical E-field on X and Y polarizations.

Figure 8:
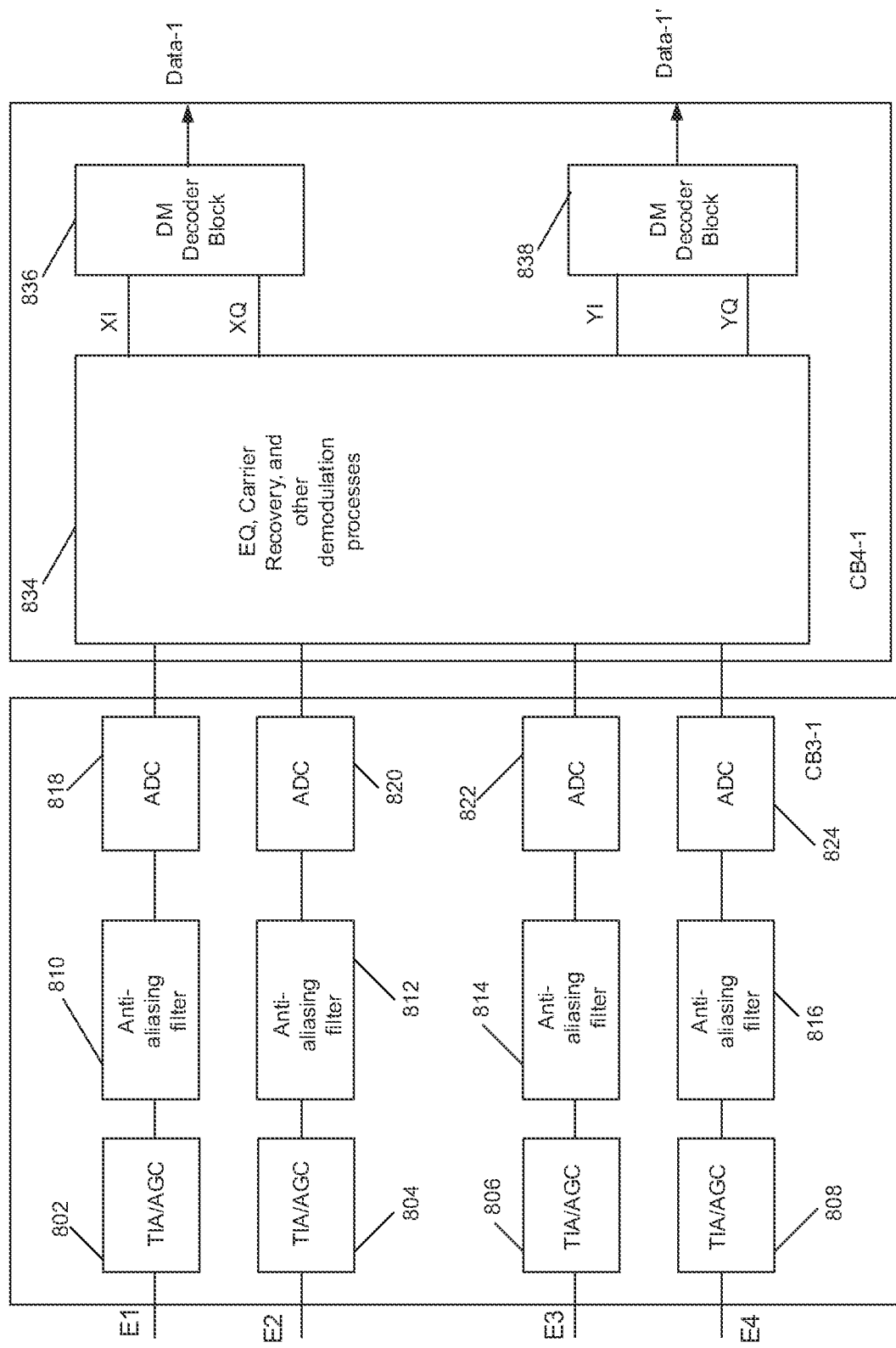
FIG. 8 illustrates a portion of the receive block shown in FIG. 6.

FIG. 8 shows circuitry or circuit blocks CB3-1 and CB4-1 in greater detail. It is understood that remaining circuit blocks CB3-2 to CB3-*n* of ASIC 606 have a similar structure and operate in a similar manner as circuit block CB3-1. In addition, it is understood that remaining circuit blocks CB4-2 to CB4-*n* of DSP 608 have a similar structure and operation in a similar manner as circuit block CB4-1.

Circuit block CB3-1 includes known transimpedance amplifier and automatic gain control (TIA/AGC 802) circuitry 802, 804, 806, and 808 that receives a corresponding one of electrical signals E1, E2, E3, and E4. Each of circuitry 802, 804, 806, and 808, in turn, supplies corresponding electrical signals or outputs to respective ones of anti-aliasing filters 810, 812, 814, and 816, which, constitute low pass filters that further block, suppress, or attenuate high frequency components due to known "aliasing". The electrical signals or outputs form filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate, as described in greater detail in U.S. Pat. No. 8,477,056, the entire contents of which are incorporated herein by reference.

As further shown in FIG. 8, digital outputs of ADCs 818, 820, 822, and 824 are supplied to circuit block 834, which may carry out equalization, carrier recovery, and other demodulation processing on such ADC outputs to provide outputs XI, XQ, Yi, and YQ corresponding to XI, XQ, YI, and YQ discussed above in connection with FIGS. 3 and 4a above. Outputs XI and XQ are provided to decoder block 836, and YI, and YQ are provided to DM decoder block 838 (see FIG. 8).

Figure 9:
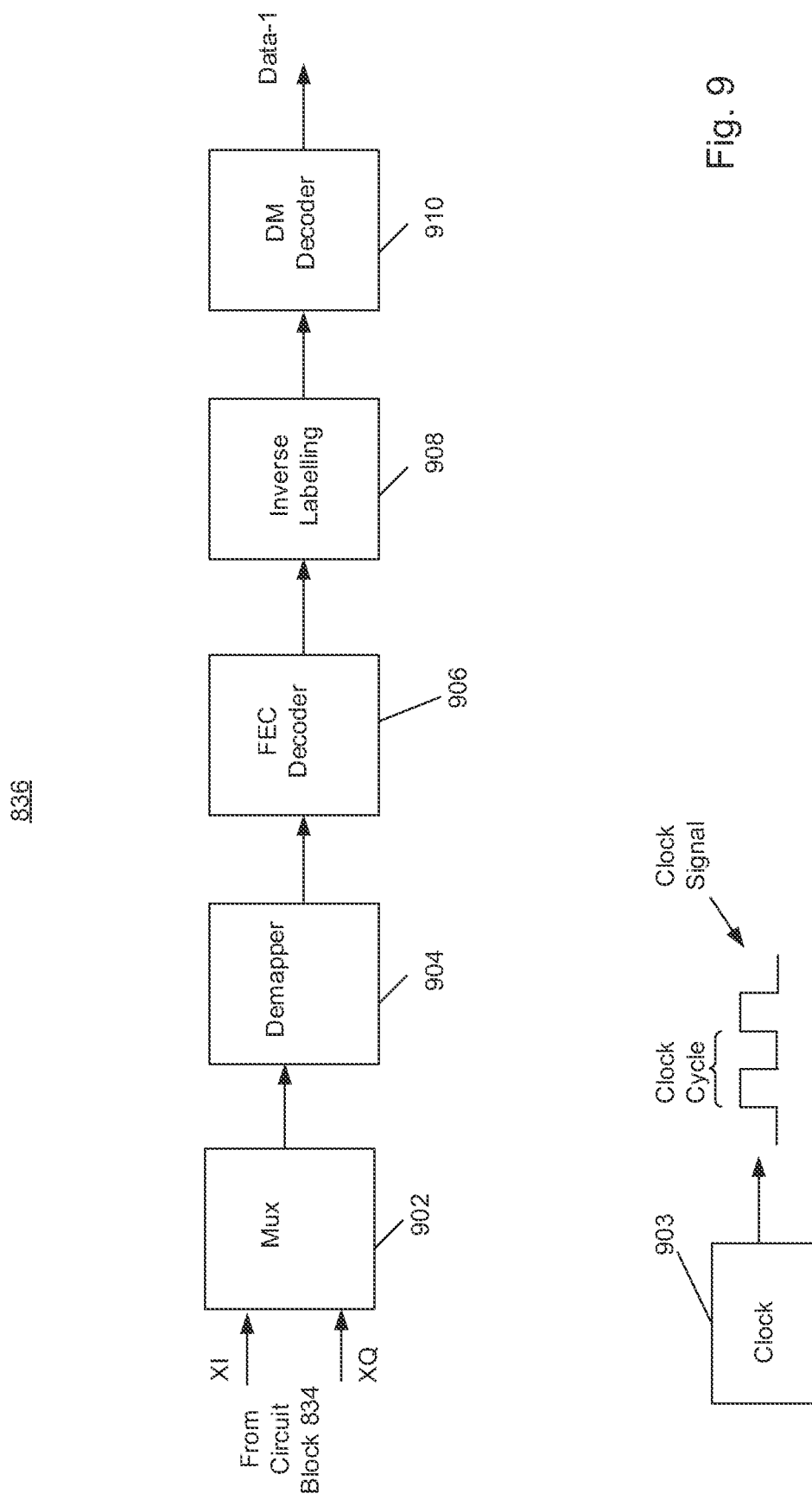
FIG. 9 illustrates a decoder circuit consistent with an additional aspect of the present disclosure.

FIG. 9 shows decoder block 836 in greater detail. It is understood that decoder block 838 has the same or similar structure as decoder block 836. In addition, decoder block 838 operates in the same or similar manner as decoder block 836. Decoder block 834 may include a multiplexer 902 that multiplexes the in-phase (XI) and quadrature (Q) symbols output from circuit block 834. The multiplex output is supplied to a demapper circuit 904, which calculates soft or hard information regarding the bits that are carried by the symbols and supplies an output to FEC decoder 906. FEC decoder 906 decodes the encoded symbols and outputs labels (corresponding to the labels output from labelling circuit 404) to inverse labelling circuit 908, which assigns each label to a corresponding codeword symbol, and thus carries out the inverse operation as labelling circuit 404. DM decoder 910 next decodes the codeword symbols of each codeword to provide a copy of each input data sequence (Data-1) supplied to DM encoder 402 every n clock signals of the clock signal output from clock 903. The codeword is based on electrical signals, such as E1 and E2 output from balanced photodiodes shown in FIG. 7. Such decoding may be in accordance with fixed-point representations of the of the codeword. The operation of DM decoder 910 is discussed in greater detail below.

Details of the operation of DM encoder 402 will next be described with reference to FIGS. 10-12.

FIG. 10 illustrates an example of a series of input bit sequences, each having k=3 bits, and corresponding codewords, each having n=5 symbols. Here, each symbol of the codeword is represented by a single bit. It is within the scope of the present disclosure, however, that multi-bit symbols may represent each codeword, wherein the codeword symbols may constitute any arbitrary alphabet, i.e., codeword symbols having values other than "0" and "1", may be encoded. The encoding described in the present examples may employ fixed-point precision in which the input data sequences, for example, are represented by a fixed number of digits or fixed-point representations. It is understood that the encoding and decoding described herein is exemplary. Other codeword lengths and other arbitrary alphabets are contemplated. In addition, the encoding and decoding described herein may be employed to encode and decode codewords indicative of the probability distributions associated with symbols and constellations points carried by optical signals modulated in accordance with an m-QAM modulation form, where m is greater than or equal to 16. Such modulation formats may have three, four, five or more amplitude levels.

In the example shown in FIG. 10, each codeword has three "1"s and two "0"s. The three "1"s represent a 60% probability (3/5) of transmission of a lower amplitude (i.e., inner constellation point) of the in-phase component and a 60% probability of low amplitude (inner constellation point) of the quadrature component. Consistent with the present disclosure, FIG. 11 shows an example of a 16 QAM constellation 1100. Each point of the constellation is labeled with its corresponding transmission probability, which is determined based on codewords similar to those shown in FIG. 10. Each point may be defined by an in-phase amplitude and a quadrature amplitude. Each amplitude being defined by the alphabet {0, 1, 2}, where symbols 1 and 2 define points having a particular distance from the origin 0 of the IQ plane 1150 and the 0 symbol identifies which whether the constellation point is located along the positive or negative sections of the I and Q axes. Thus, for example, point 1104-1 is defined by an amplitude along the I axis corresponding to first symbol (the "0" of the alphabet) that designates the positive I axis, in this example. The I amplitude further being defined by second/third symbols (the "1" and "2") of the alphabet, such that the amplitude has a magnitude AI in FIG. 11. Point 1104-1 is further defined by an amplitude along the Q axis corresponding to first symbol (the "0" of the alphabet) that designates the positive Q axis, in this example. The amplitude further being defined by second/third symbols (the "1" and "2") of the alphabet, such that the amplitude has a magnitude AQ in FIG. 11. The remaining points in the constellation are defined in a similar fashion by codewords encoded and decoded, as described below.

Figure 11:
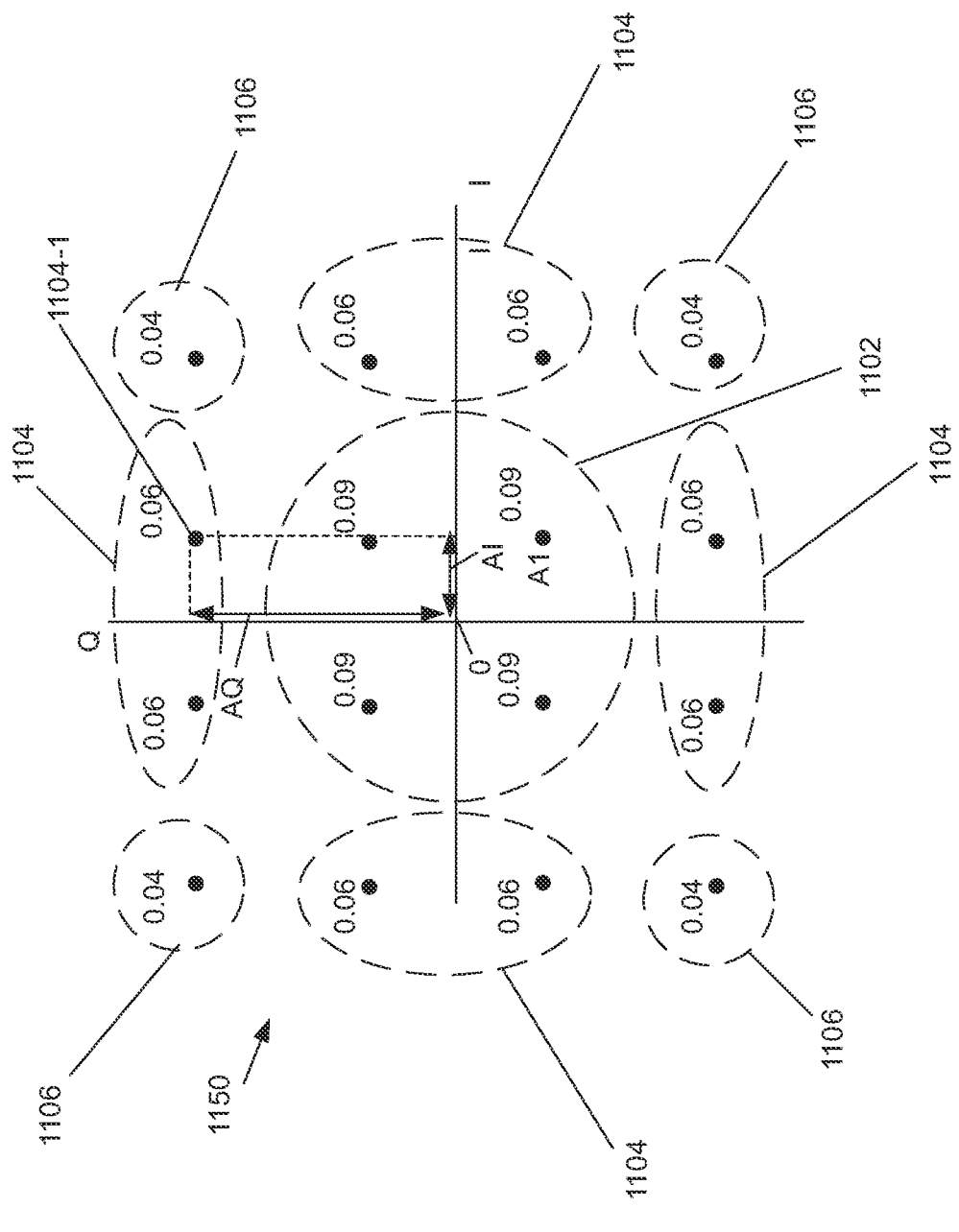
FIG. 11 illustrates an example of a constellation and transmission probabilities for the codewords shown in FIG. 10.

In the example shown in FIG. 11, the codewords designate a 60% probability of transmission of lower amplitude in-phase and quadrature components and result in the transmission probabilities for the constellation points shown in FIG. 11. Namely, each of the inner (low amplitude) points 1102 with amplitude A1 have a 9% symbol transmission probability; each of middle (intermediate) points 1104 has a 6% symbol transmission probability; and each of outer (high) amplitude points 1106 has a 4% symbol transmission probability. Thus, points 1102 are transmitted more frequently than points 1104, which, in turn, are transmitted more frequently than points 1106. The sum of each of these probabilities is one (100%). The fixed-point processing of input bit sequences described herein may be employed to encode and decode codewords corresponding to the probability distribution shown in FIG. 11 or any other probability distribution. Examples of other codewords and corresponding probability distributions for a 64 QAM constellation (optical signals modulated in accordance with a 64 QAM modulation format) are discussed below with reference to FIGS. 318-19. Such codewords may also generated in a manner similar to that described above in which the codewords may define amplitude along the I and Q axes that define each constellation point. Consistent with the present disclosure, based on such codewords, optical signals modulated with the modulators disclosed herein may generate sequences of modulation symbols, each corresponding to a respective constellation points (e.g., symbols 0010 and 0000 associated with a respective one of points 1106; symbols 1111 and 0111 associated with a respective one of points 1102) in FIG. 11, wherein certain symbols, such as those associated with constellation points 1102 (having amplitude A1), for example, are transmitted more frequently than modulation symbols associated with constellation points 1106 having amplitude A3. Encoding and decoding of such symbols and codewords is discussed in greater detail below.

Figure 12:
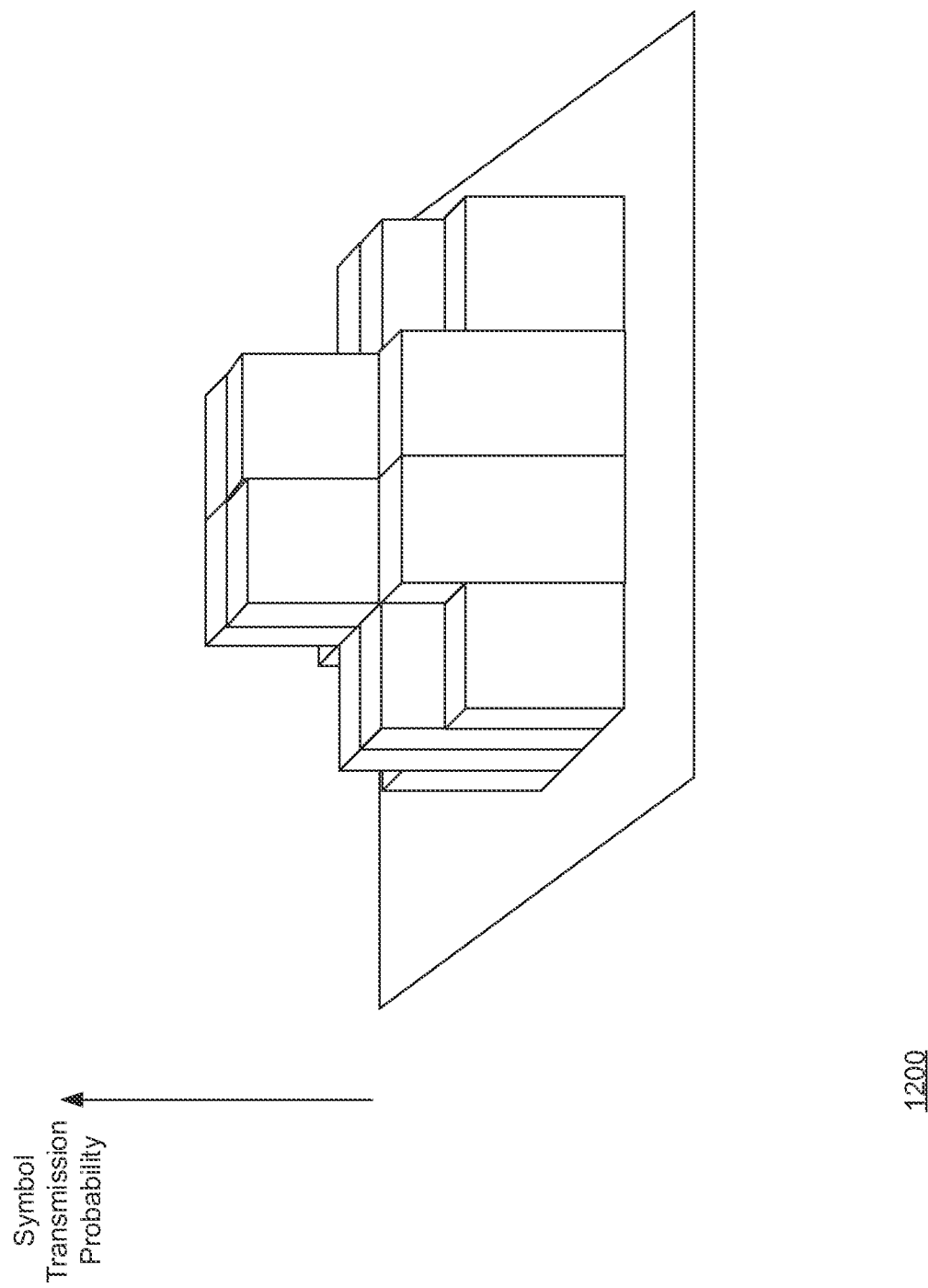
FIG. 12 graphically illustrates a transmission probability distribution corresponding to the probabilities shown in FIG. 11.

FIG. 12 illustrates a three-dimensional representation 1200 of the symbol transmission probabilities shown in FIG. 11.

Figure 14:
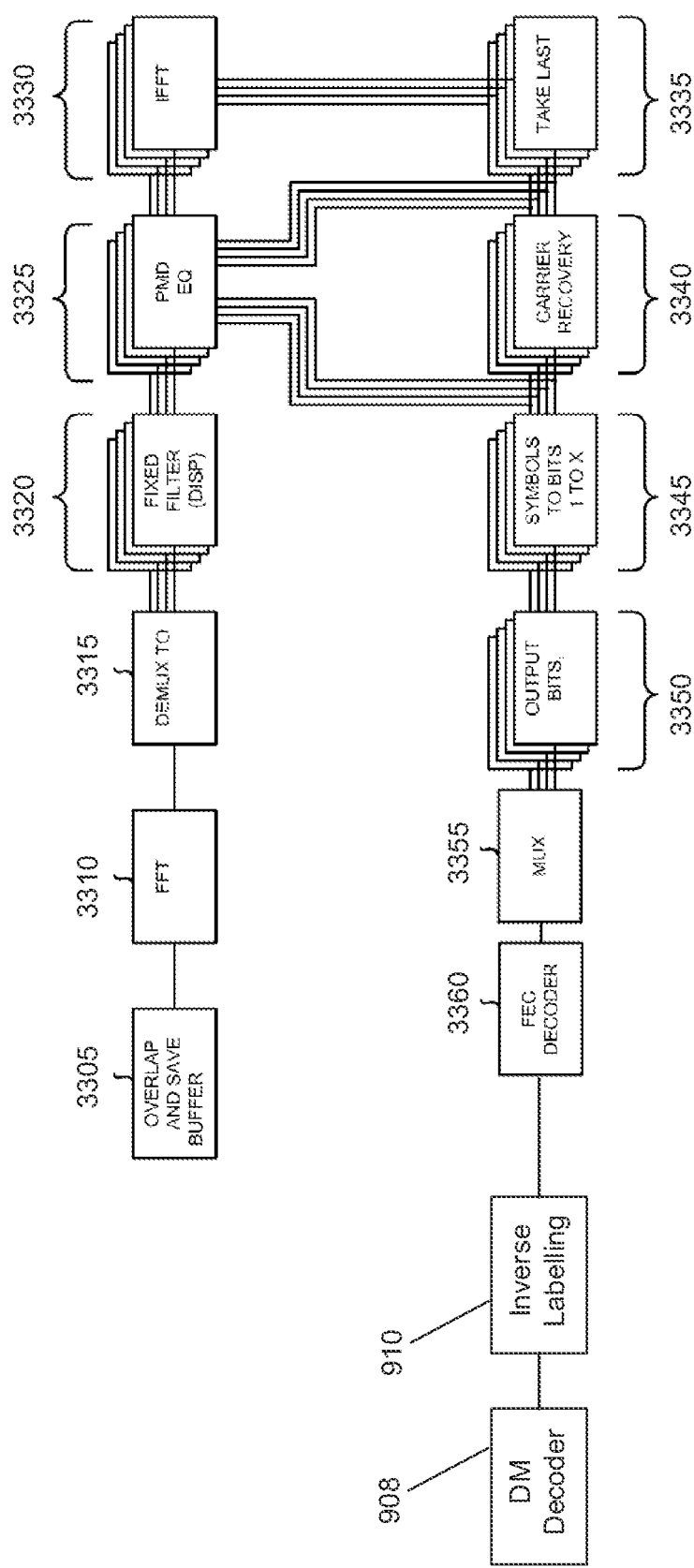
FIG. 14 illustrates an additional example of a portion of an optical receiver consistent with an aspect of the present disclosure.

An example of the decoding method consistent with the present disclosure will next be described with referenced to FIGS. 14 and 15.

The decoding algorithm can be terminated in different ways. In one example, DM decoder 910 (shown in FIG. 9) run n−1 times, i.e., for n−1 clock cycles. For the last run (the last clock cycle), the symbol processing is performed.

As noted above, during each run or clock cycle, encoder module 402, encodes one codeword symbol to realize the desired modulated symbol probability distribution. This will be repeated until all the desired symbols are generated. After n runs (clock cycles) of the encoder engine, the AFC model freezes with all entries equal to zero. Thus, no further symbol is generated as no further refinement happens on IPI.

The decoding process is implemented successively; i.e., processing one symbol at a time. In this case the decoder need not need to wait until the entire encoded symbol sequence is available to start the decoding. Instead, decoder 910 may start the decoding process as soon as the first encoded symbol is received or made available. Fixed-point encoding and decoding allows for a simpler design and can be realized with fewer integrated circuit gates than would otherwise could be achieved with a floating point-based process. In addition, such fixed-point processing may be employed to encode and decode arbitrarily large codewords having any alphabet. Accordingly, the probability distributions can be tailored for any constellation, such as constellation associated with m-QAM modulation formats, where m is an integer greater than or equal to 16, such 16-QAM, 64-QAM, and 256-QAM, and having 3, 4, 5 or more amplitude levels.

In the above examples, each modulated optical signal output from each of the transmitter blocks 12-1 to 12-n is associated with a respective laser, such as laser 508 (see FIG. 5) and each carries data indicative of a corresponding codeword. Accordingly, each such modulated optical signal or channel has a desired transmission probability distribution, as further discussed above. Consistent with the present disclosure, however, multiple channels or subcarriers may be output from each of optical source, such as OS-1 shown in FIG. 2, and each such subcarrier may carry data indicative of a corresponding codeword. Accordingly, each subcarrier may have a desired transmission probability distribution, as further discussed above.

Figure 13:
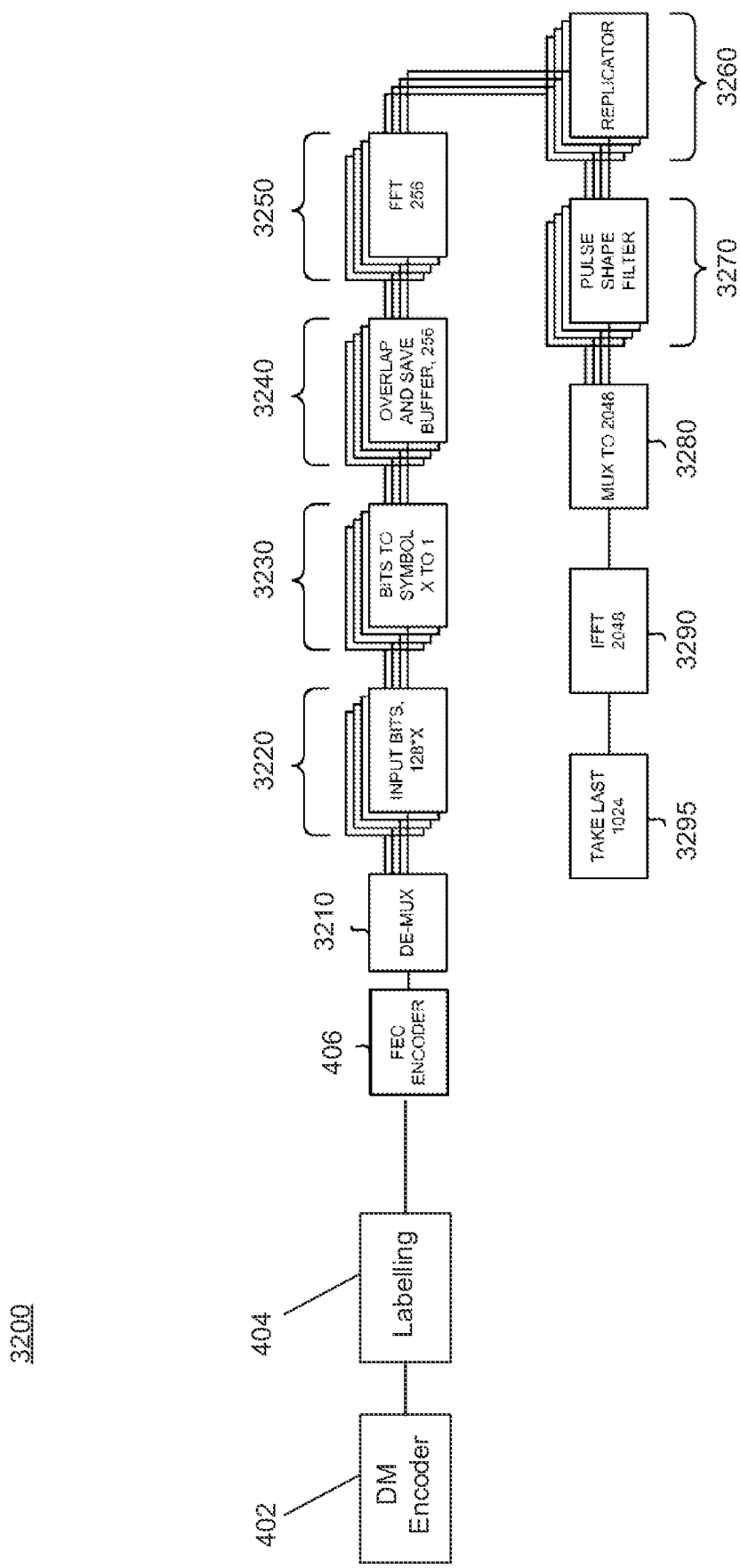
FIG. 13 illustrates an additional example of a portion of an optical transmitter consistent with an aspect of the present disclosure.

FIG. 13 shows an example of circuit block CB1-1 that may be employed to generate digital subcarriers and based on such digital subcarrier optical subcarriers or Nyquist subcarriers that may not overlap in frequency may be output from the transmitter blocks 12. Moreover, such Nyquist subcarriers may each be modulated in accordance with a desired probability distribution, as noted above.

As shown in FIG. 13, CB1-1 (shown as transmitter block 3200) may include a DM encoder (402), labelling (404), and FEC encoder (406) circuits similar to or the same as that discussed above in connection with FIG. 4a. However, FEC encoder circuit 406 may, instead of supplying bits or symbols to QAM mapper 408, supply such bits or symbols to a demultiplexer or de-mux component 3210, which demultiplexes the bits received from FEC encoder 406. In this example, de-mux component 3210 may separate the stream of bits into groups of bits associated with four subcarriers, however, it is understood that de-mux components may separate the received bits into another number of subcarriers. In some implementations, the bits may be separately or jointly encoded for error correction in de-mux component 3210, using forward error correction. De-mux component 3210 may use the error correction encoding to separate the bits for the different subcarriers. De-mux component 3210 may be designed to systematically interleave bits between the subcarriers. De-mux component 3210 may also be designed to generate timing skew between the subcarriers to correct for skew induced by link 21 (see FIG. 1). De-mux component 3210 may provide each group of bits to a corresponding input bits component 3220. Input bits component 3220 may process 128*X bits at a time, where X is an integer.

Bits to symbol component 3230 may map the bits to symbols on the complex plane. For example, bits to symbol component 3230 may map a number of bits to a symbol in a 16 QAM constellation, although m-QAM constellations are contemplated herein, where m is an integer that is greater than or equal to 16. Overlap and save buffer 3240 may buffer a predetermined number of symbols. Overlap and save buffer 3240 may receive a desired number of symbols at a time from bits to symbol component 3230. Thus, overlap and save buffer 3240 may combine new symbols, from bits to symbol component 3230, with the previous symbols received from bits to symbol component 3230.

FFT component 3250 may receive symbols from overlap and save buffer 3240 and convert the symbols to the frequency domain using, for example, a fast Fourier transform (FFT). FFT component 3250 may form frequency bins or bit sequences corresponding to frequency components of the subcarriers as a result of performing the FFT. Replicator component 3260 may replicate the frequency bins to form additional frequency bins (e.g., for T/2 based filtering of the subcarrier) to thereby increase the sample rate.

Pulse shape filter 3270 may apply a pulse shaping filter to the frequency bins to calculate transitions between the symbols and the desired spectrum so that the corresponding optical subcarriers can be packed together spectrally during transmission. Pulse shape filter 3270 may also be used to introduce timing skew between the subcarriers to correct for timing skew induced by link 230. Mux component 3280 may receive the subcarriers (from the pulse shape filters 3270) and multiplex them together to form an element vector.

IFFT component 3290 may receive the element vector to convert back to the time domain. IFFT component 3290 may convert the signal to the time domain using, for example, an inverse fast Fourier transform (IFFT). Take last component 3295 may select a predetermined number of the last samples output from IFFT component 3290 and output such samples to DAC 310 and DAC 312, for example.

Figure 5:
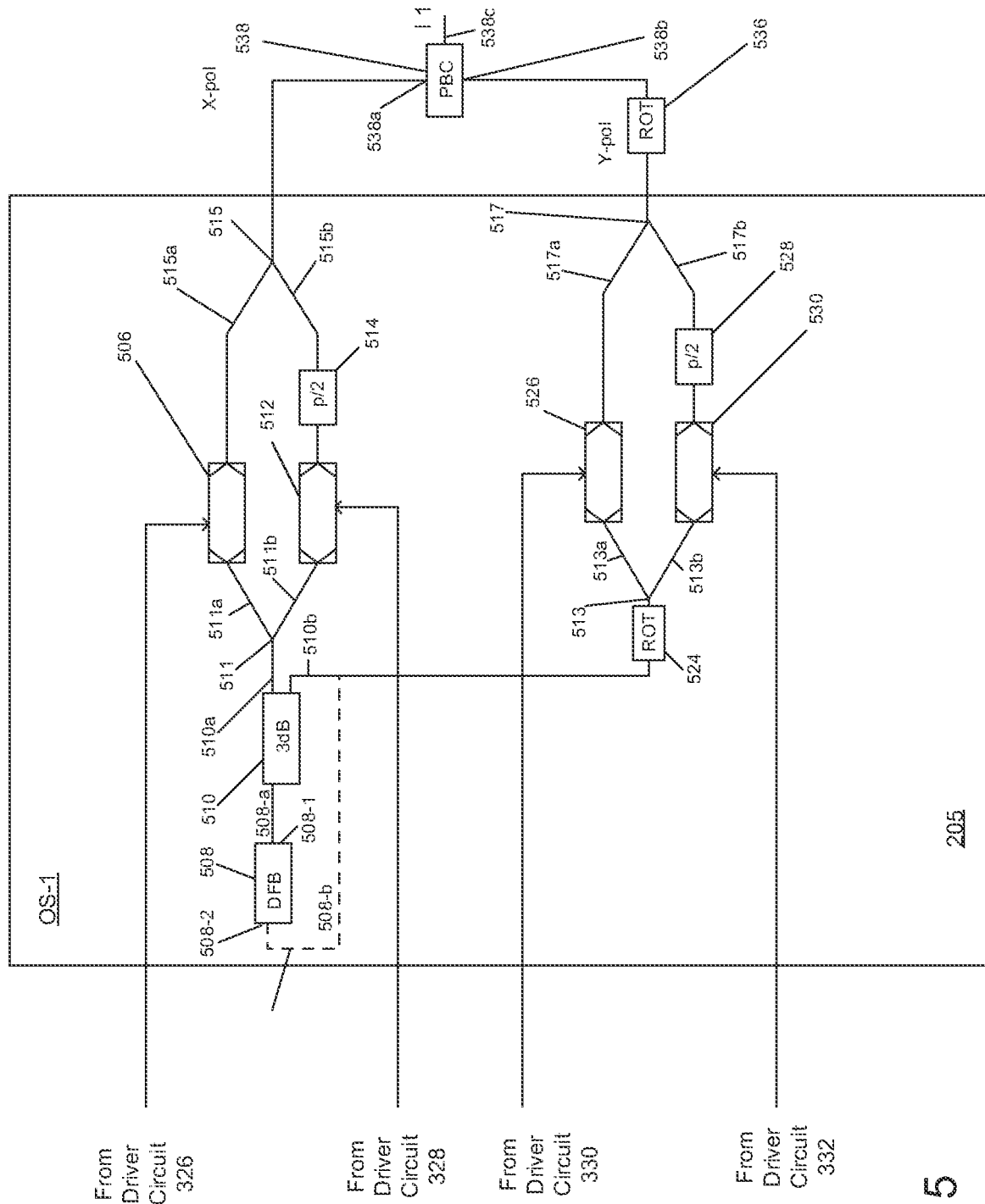
FIG. 5 illustrates a portion of transmit photonic integrated circuit consistent with the present disclosure.

While FIG. 5 shows circuitry 3200 as including a particular quantity and arrangement of functional components, in some implementations, circuitry 3200 may include additional functional components, fewer functional components, different functional components, or differently arranged functional components.

As noted above, the outputs of the DAC 310 and 312 may provide inputs to driver circuits 326, which, in turn, supply drive signals to modulators 506 and 512. As further discussed above, based on such drive signals, the modulators output modulated optical signals. Here, such modulated optical signals may include optical subcarriers corresponding to the digital subcarriers discussed in connection with FIG. 13.

It is noted that additional circuitry, similar to that shown in FIG. 13 may also be employed to generate outputs to DACs 314 and 316 that supply signals to drivers 330 and 332 (see FIG. 3). As noted above, such drive signals may be used to drive modulators 526 and 530 to output optical subcarriers. The optical subcarriers output at 515 in FIG. 5 may be carried by a TE or X component of the modulated optical signals, while the optical subcarriers generated at 517 in FIG. 5 may be carried by the TM or Y component of the modulated optical signal.

As noted above, optical signals are transmitted from a transmit end of optical communication path or link 16 to a receive end. Optical subcarriers, as further noted above, similarly propagate along the path or link 16 to a receiver. The optical subcarrier, in a manner similar to that described above, are likewise provided to a an optical demultiplexer 86 or power splitter shown in FIG. 1a, and power split portions of the optical subcarriers are provided to a polarization beam splitter, as shown in FIG. 7. The TE and TM components of the optical subcarriers are mixed with local oscillator light in a manner similar to that described above, and the resulting mixing products are provided to photodiodes 709, 711, 713, and 715, as further shown in FIG. 7.

The outputs of the photodiodes are subject to further processing by circuitry in circuit block CB3-1, including analog-to-digital conversion (ADC) circuits 818, 820, 822, and 824 show in FIG. 8.

As further shown in FIG. 8, the outputs of ADC circuits 818, 820, 822, and 824 provide digital outputs that may be processed by a digital signal processor (DSP) including, in the case of subcarrier transmission noted above, the circuitry shown in FIG. 30. Namely, samples output from ADC circuits 818, 820, 822, and 824 may be provided to overlap and save buffer 3305, which may receive such samples from the ADC circuits, and combine those samples with previously received samples to form vector elements. FFT component 3310 may receive the vector elements from overlap and save buffer 3305 and convert the vector elements to the frequency domain using, for example, a fast Fourier transform (FFT). FFT component 3310 may convert the vector elements to corresponding frequency "bins" or sequences as a result of performing the FFT.

De-mux component 3315 may receive the frequency bins from FFT component 3310. De-mux component 3315 may demultiplex the frequency bins to element vectors, for example, one element vector for each of subcarrier. Filter 3320, which may be a fixed filter, may apply a filtering operation for, for example, dispersion compensation and may compensate for the relatively slow varying parts of the channel. Fixed filter 3320 may also compensate for skew across subcarriers introduced in the link or skew introduced intentionally in one of transmitter blocks 12.

PMD component 3325 may apply polarization mode dispersion (PMD) equalization to compensate for PMD and polarization rotations. PMD component 3325 may also receive and operate based upon feedback signals from take last component 3335 and/or carrier recovery component 3340.

IFFT component 3330 may covert the element vectors (after processing by fixed filter component 3340 and PMD component 3325) back to the time domain as a predetermined number of samples. IFFT component 3330 may then convert the element vectors to the time domain using, for example, an inverse fast Fourier transform (IFFT). Take last component 3335 may select the last q (q being a positive integer) samples from IFFT component 3330 and output the q samples to carrier recovery component 3340.

Carrier recovery component 3340 may apply carrier recovery to compensate for transmitter and receiver laser linewidths. In some implementations, carrier recovery component 3340 may perform carrier recovery to compensate for frequency and/or phase differences between the transmit signal and the signal from local oscillator 701 (see FIG. 7). After carrier recovery, the data may be represented as symbols in the QPSK constellation. In some implementations, as described above, the output of take last component 3335 and/or carrier recovery component 3340 could be used to update PMD component 3325.

Symbols to bits component 3345 may receive the symbols output from carrier recovery component 3340 and map the symbols back to bits. For example, symbol to bits component 3345 may map one symbol, in a constellation, to X bits, where X is an integer. In some implementations, the bits could be decoded for error correction using, for example, FEC. Output bits component 3350 may output j*X (j being an integer) bits at a time.

Mux component 3355 may combine the subcarriers together and undo the systematic interleaving introduced in de-mux component 3210 (see FIG. 13). FEC decoder 3360 may process the output of mux component 3355 to remove errors using forward error correction. Next, the output of FEC decoder 3360 may be supplied to inverse labelling circuitry 910, which supplies further outputs to DM decoder circuit 908, as described above. DM decoder 908, in turn, decodes the output of inverse labelling circuit 910 to supply the original bit sequence in a manner the same as or similar to that described above.

Figure 15:
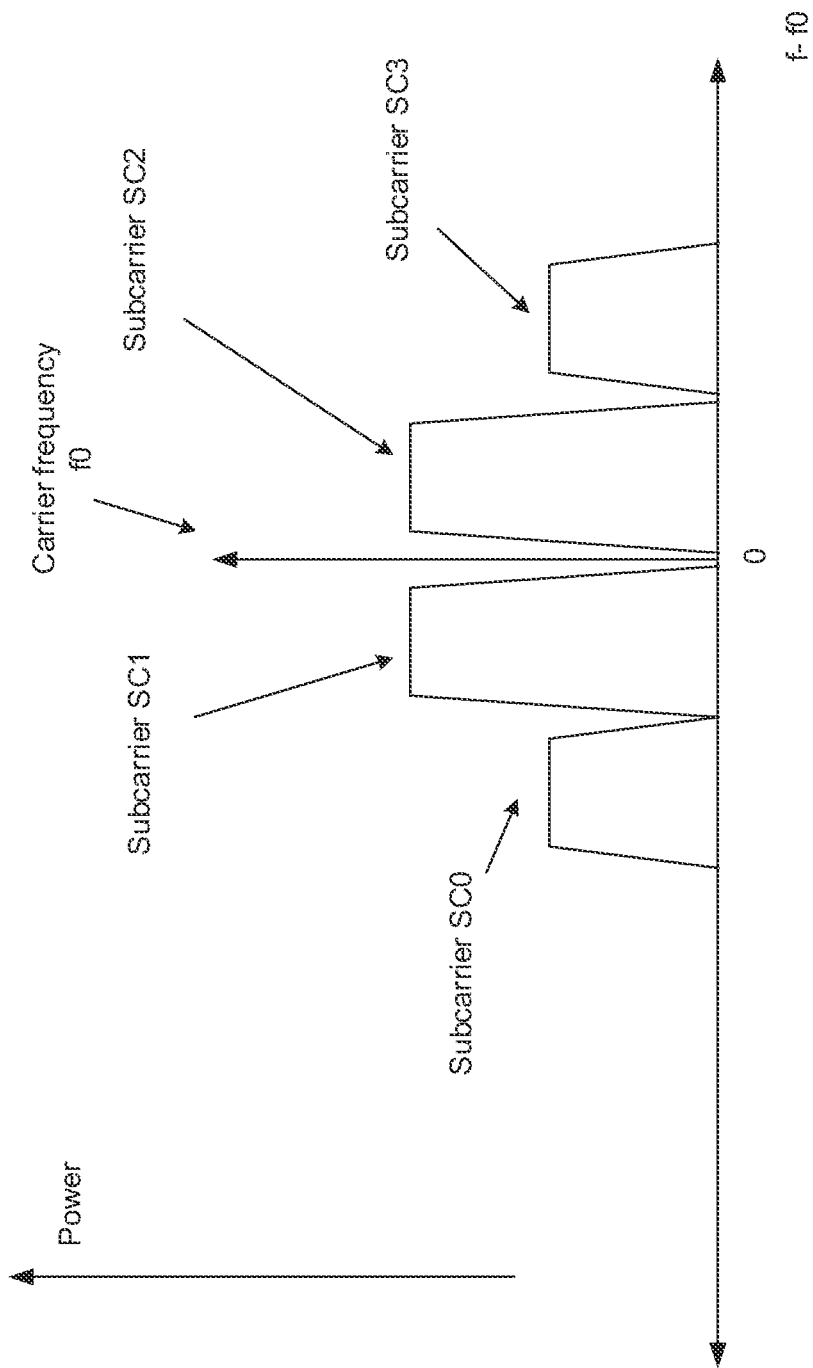
FIG. 15 illustrates an example a spectrum including representations of subcarriers in the frequency domain consistent with an aspect of the present disclosure.

FIG. 15 illustrates an example of subcarriers SC0 to SC3 output from one of transmitter blocks 12 (see FIG. 1) including the circuitry shown in FIG. 13. As shown in FIG. 15, subcarriers SC0 to SC3 may not spectrally overlap with one another and may be, for example, Nyquist subcarriers, which may have a frequency spacing equal to or slightly larger than the individual subcarrier baud-rate.

As further shown in FIG. 15, subcarriers may also have spectra that are provided above (subcarriers SC2 and SC3) and below (subcarriers SC0 and SC1) a carrier frequency f0, which may correspond to a center frequency of the laser (e.g., laser 508). As further shown in FIG. 15, subcarriers SC0 and SC3 may, due to transmission impairments along optical communication path 16, be selectively attenuated, and, therefore, may have less power than subcarriers SC1 and SC2. Alternatively, subcarriers SC0 and SC3 may having a higher bit error rate (BER) than subcarriers SC1 and SC2. Consistent with an aspect of the present disclosure, subcarriers SC0 and SC3 may be modulated in accordance with a transmission probability distribution having an associated spectral efficiency (SE) that may be less than the SE (and corresponding transmission probability distribution) of subcarriers SC1 and SC2. In particular, symbols associated with inner points of the constellation associated with subcarriers SC0 and SC3 may be transmitted more frequently and with a higher first probability than symbols associated with outer points of the constellation that are transmitted with a lower second probability. Likewise, symbols associated with inner points of the constellation associated with subcarriers SC1 and SC2 may be transmitted more frequently and with a higher third probability than symbols associated with outer points of the constellation that are transmitted with a lower fourth probability. Further, in this example, the first probability associated with the inner symbols carried by SC0 and SC3 is greater than the third probability associated with the inner symbols carried by SC1 and SC2, such that SC0 and SC3 have a greater SNR (lower SE) to offset impairments noted above. SC1 and SC2 may, in this example, have fewer impairments than SC0 and SC3, and thus may be transmitted with a higher SE than that of SC0 and SC3, and a transmission probability distribution may be selected for SC0 and SC3 to realize such higher SE. Thus, in the example shown in FIG. 15, subcarriers may be transmitted with different transmission probability distributions tailored to a desired SE for each subcarrier so that the transmission rate or baud rate for each subcarrier may be optimized.

Figure 16:
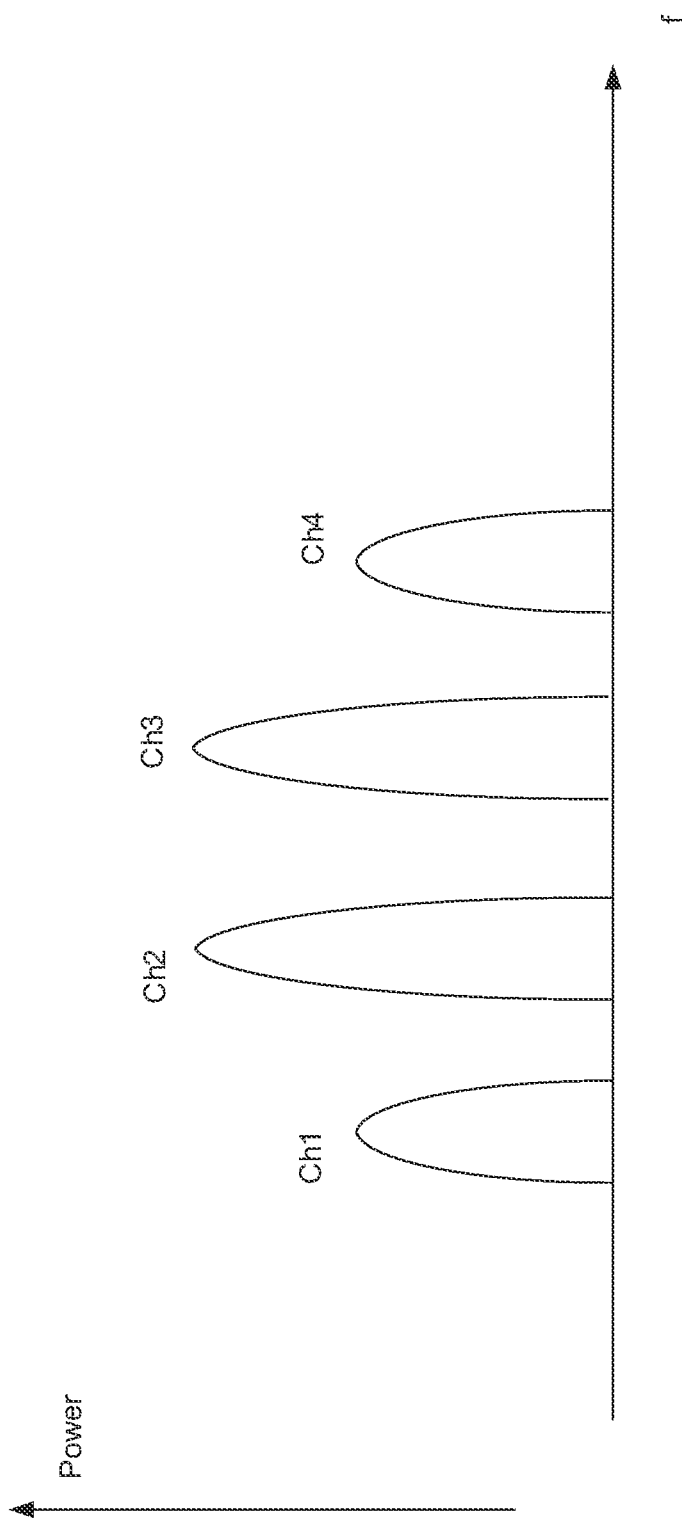
FIG. 16 illustrates an example of a spectrum including representations of channels in the frequency domain consistent with the present disclosure.

As shown in FIG. 16, similar optimization may be achieved in connection with individual channels, in which each channel is generated by light corresponding to a corresponding one of a plurality of lasers, each one having the same or similar construction as laser 508, as opposed to the subcarriers described above which are generated from light output from one laser.

In FIG. 16, channels Ch1 and Ch4 may, due to transmission impairments along optical communication path 16, be selectively attenuated, and, therefore, may have less power than channels Ch2 and Ch3. Alternatively, channels Ch1 and Ch4 may have a higher BER than channels Ch2 and Ch3. Consistent with a further aspect of the present disclosure, channels or optical signals Ch1 and Ch4 may be modulated in accordance with a transmission probability distribution having an associated spectral efficiency (SE) that may be less than the SE (and corresponding transmission probability distribution) of channels or optical signals Ch1 and Ch4. In particular, symbols associated with inner points of the constellation associated with channels ch1 and Ch4 may be transmitted more frequently and with a higher first probability than symbols associated with outer points of the constellation that are transmitted with a lower second probability. Likewise, symbols associated with inner points of the constellation associated with channels Ch2 and Ch3 may be transmitted more frequently and with a higher third probability than symbols associated with outer points of the constellation that are transmitted with a lower fourth probability. Further, in this example, the first probability associated with the inner symbols carried by Ch1 and Ch4 is greater than the third probability associated with the inner symbols carried by Ch2 and Ch3, such that channels Ch1 and Ch4 have a greater SNR (lower SE) to offset the impairments noted above. Channels Ch2 and Ch3 may, in this example, have fewer impairments than channels Ch1 and Ch4, and thus may be transmitted with a higher SE than that of Ch1 and Ch4, and a transmission probability distribution may be selected for Ch2 and Ch3 to realize such higher SE. Thus, in the example shown in FIG. 16, channels may be transmitted with different transmission probability distributions tailored to a desired SE for each channel so that the transmission rate or baud rate for each channel may be optimized.

Figure 17:
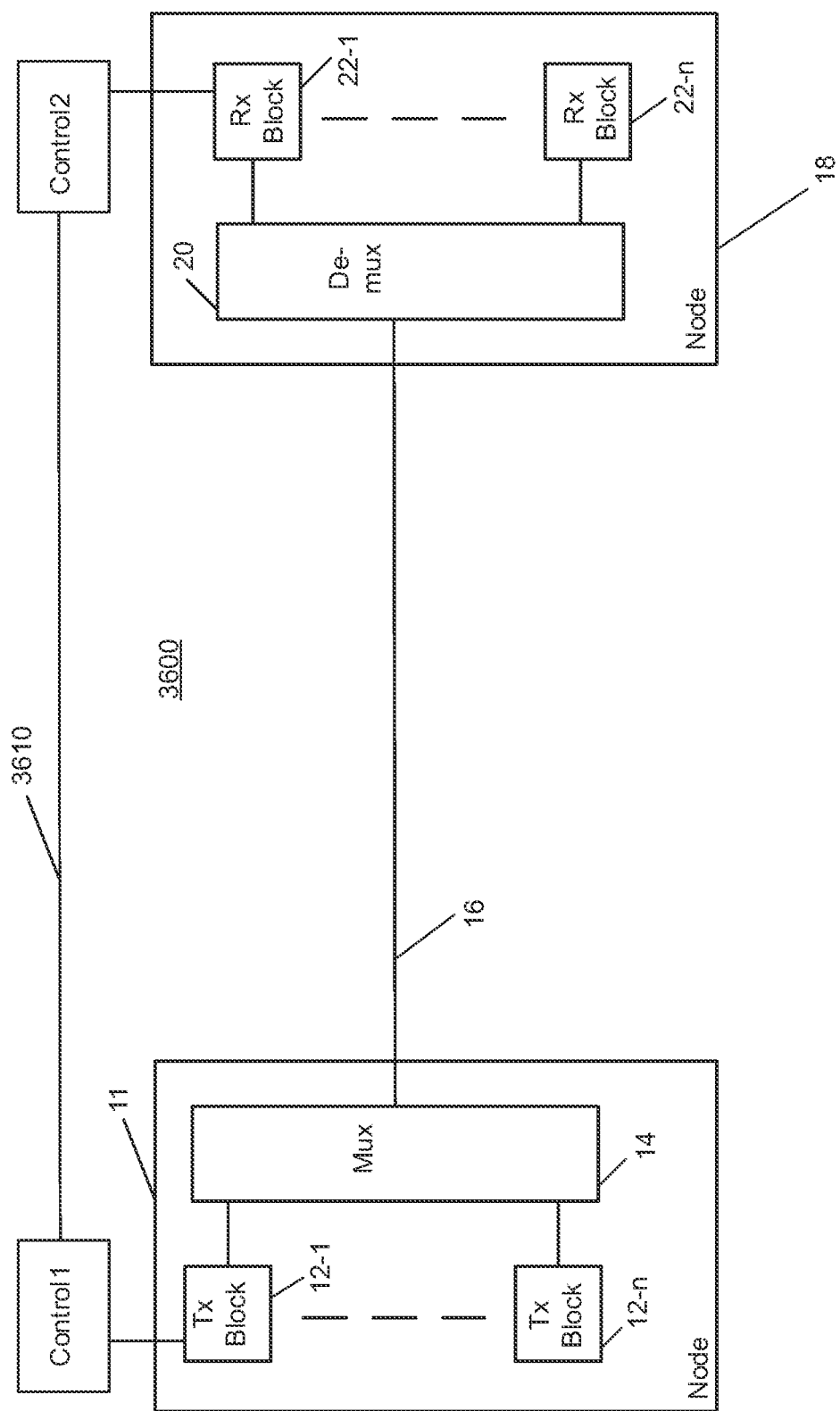
FIG. 17 illustrates a further example of an optical communication system consistent with the present disclosure.

An example of a communication system 3600 consistent with an additional aspect of the present disclosure will next be described with reference to FIG. 17. System 3600 is similar to system 100 described above in connection with FIG. 1, and includes first and second control circuits, which are labeled in FIG. 17 as "Control1" and "Control2." Control circuit Control2 may receive network monitoring parameters, such as bit error rate (BER), SNR, and or other information indicative of the performance or such parameters associated with one or more channels and/or subcarriers. Such information may be received from receiver blocks 22 in Rx module 78 shown in FIG. 17. In one example, such information may be conveyed to control circuit Control1 by an out-of-band signal, such as an optical service channel to transmit module 74. Based on such information, control circuit Control1 may, in turn, provide control signals to one or more of transmitter blocks 12. Based on such control signals, further signals may be provided to DM encoder 402, for example, to generate codewords associated with a desired transmission probability distribution, e.g., a first transmission probability distribution or a second transmission probability distribution, varied based on a degradation of an optical communication path resulting in an optimized SE. Accordingly, for example, system 3600 may operate based on feedback provided by receiver blocks 22 and control circuit Control2 to optimize the transmission probability distribution of one or more of the channels and/or subcarriers output from one or more of transmitter blocks 12 shown in FIG. 17.

Figure 18:
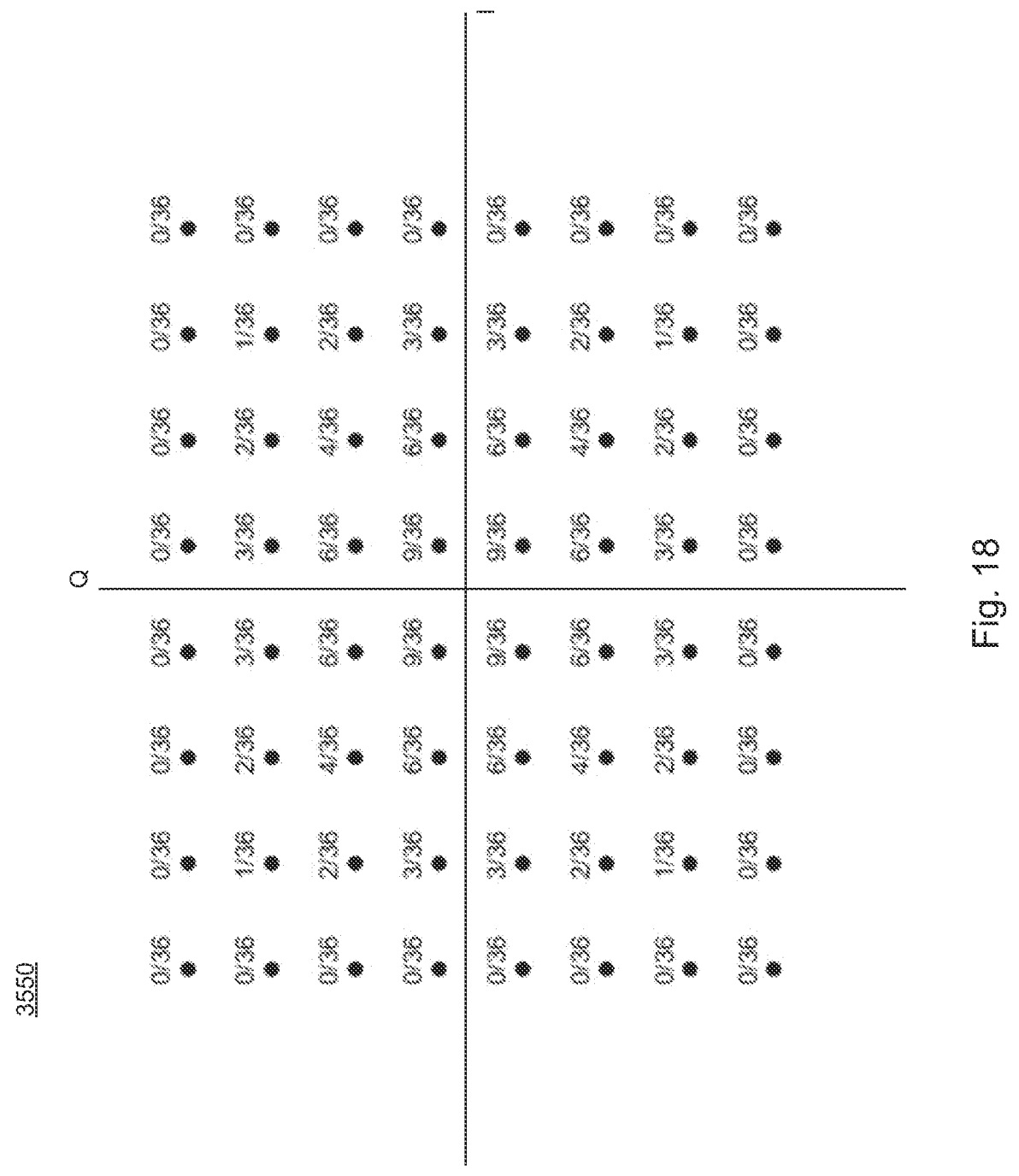
Figure 19:
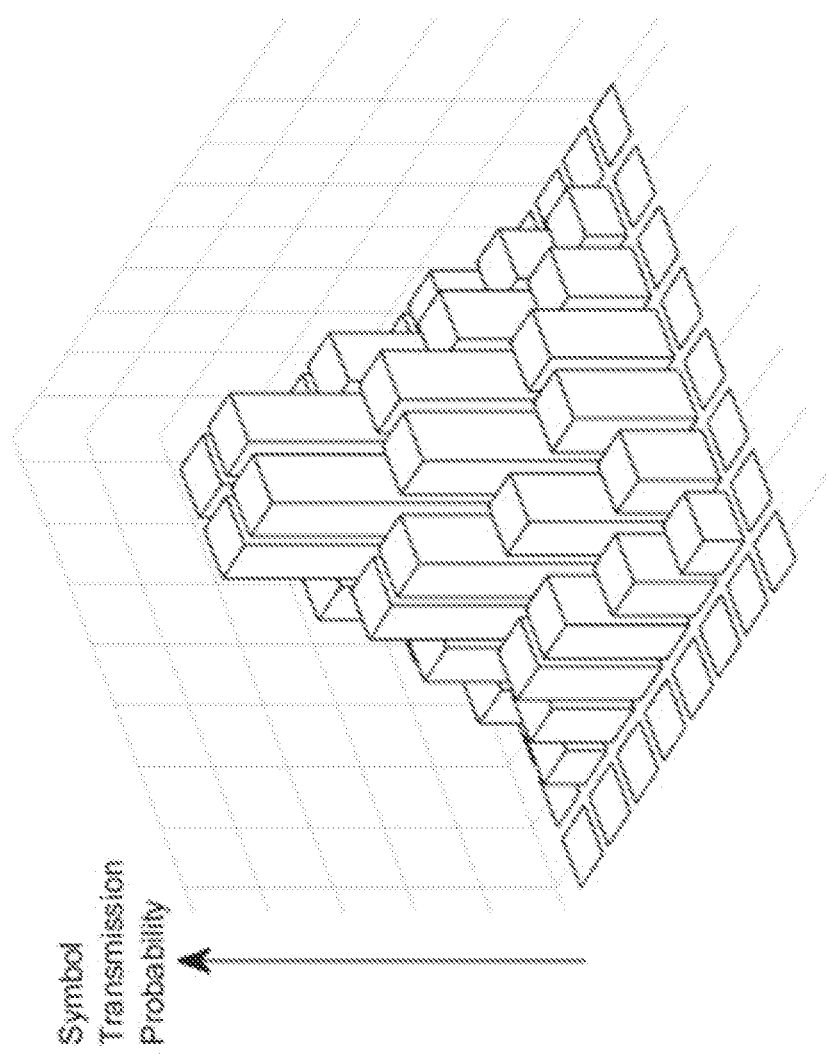
FIG. 19 shows a graphical representation of a probability distribution corresponding to the constellation point probabilities shown in FIG. 18.

In the above example, the codeword symbols may be binary in that each symbol may have one of two values, such as a '1' or a '0'. Consistent with a further aspect of the present disclosure, however, and as shown in FIGS. 18-19, the above techniques involving floating point processing for encoding and decoding codewords may also be extended to non-binary codewords in which each symbol of the codeword may have one of a plurality of values where a number of the plurality of values is more than two. FIG. 18 illustrates a constellation 3550. Here, as in FIG. 11, the '0' of the alphabet define defines whether the point is along the positive or negative sections of the I and Q axis, and the remaining points defines the magnitude of the I and Q amplitudes that are associated with each point.

FIG. 19 further illustrates the probability distributions associated with each of the points in constellation 3550 (in an I Q plane having I and Q axes) based on codeword symbols.

As discussed above, the degradation prediction algorithm 98 may use artificial intelligence to determine forecasted degradation of performance over time due to fiber/repeater aging. In some embodiments, performance attributes stored in the link database 96 will be derived from line pair carrier Q values either real time or offline via line card Flight Data Recorder (FDR) information. Although Q values can be volatile in nature with a degree of value deviation within the subsea optical communication system 10, the Q average 15 minute BIN data may be used for analysis by the degradation prediction algorithm 98. 15 minute BIN data is 1 second Q sampling over a 15 minute period when then produces average Q, minimum Q and maximum Q values over a fifteen minute period. The period can change, and 15 minutes is only an example. As the modulation format change required would be determined by the lowest carrier Q traversing the transmission line segment 38, e.g., line pair, the artificial intelligence would monitor the lowest carrier Q for forecasting modulation format changes. However all carrier performance would be logged and analyzed. This is in part due to differing spectral sections of a line pair and all equipment connected to the line pair reacting differently to changes in OSNR in terms of performance especially with dispersion shifted fiber systems. Consequently a carrier, i.e., an individual optical channel, that may have a higher performance currently could in effect be degrading at a quicker rate than the current lowest Q requiring a mode or modulation format change at a sooner interval.

As the subsea optical communication system 10 can contain up to 240 individual carrier wavelengths, for example, and that equipment monitoring each carrier may be supplying values every 15 minutes for up to a cable life of 25 years the dataset in the link database 96 for each fiber pair will be considered large thereby increasing predictive accuracy.

Figure 20:
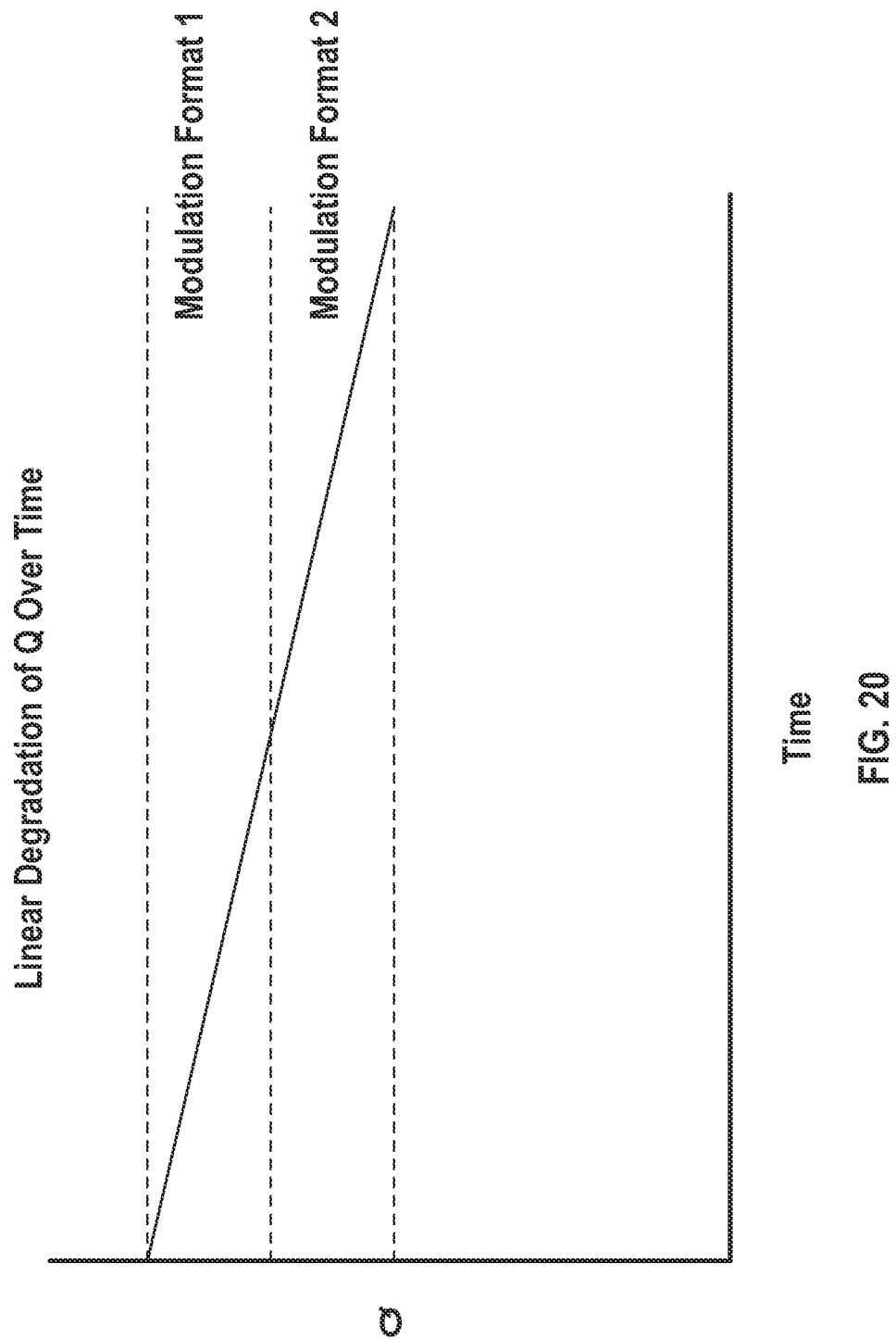
FIG. 20 is a graph showing a linear degradation of Q over time in an subsea optical communication system.
Figure 21:
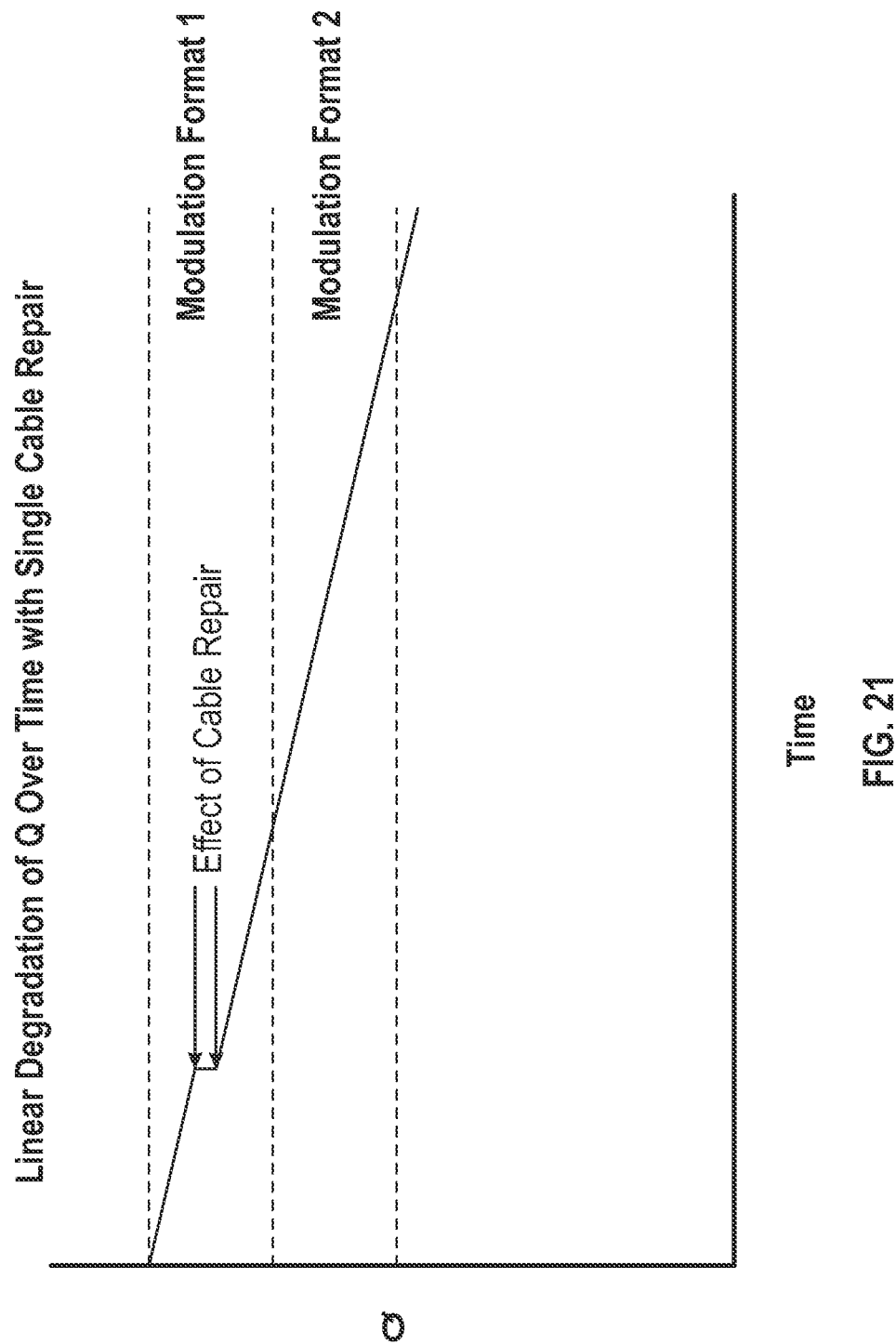
FIG. 21 is a graph showing a linear degradation of Q over time in an subsea optical communication system having a single cable repair.
Figure 22:
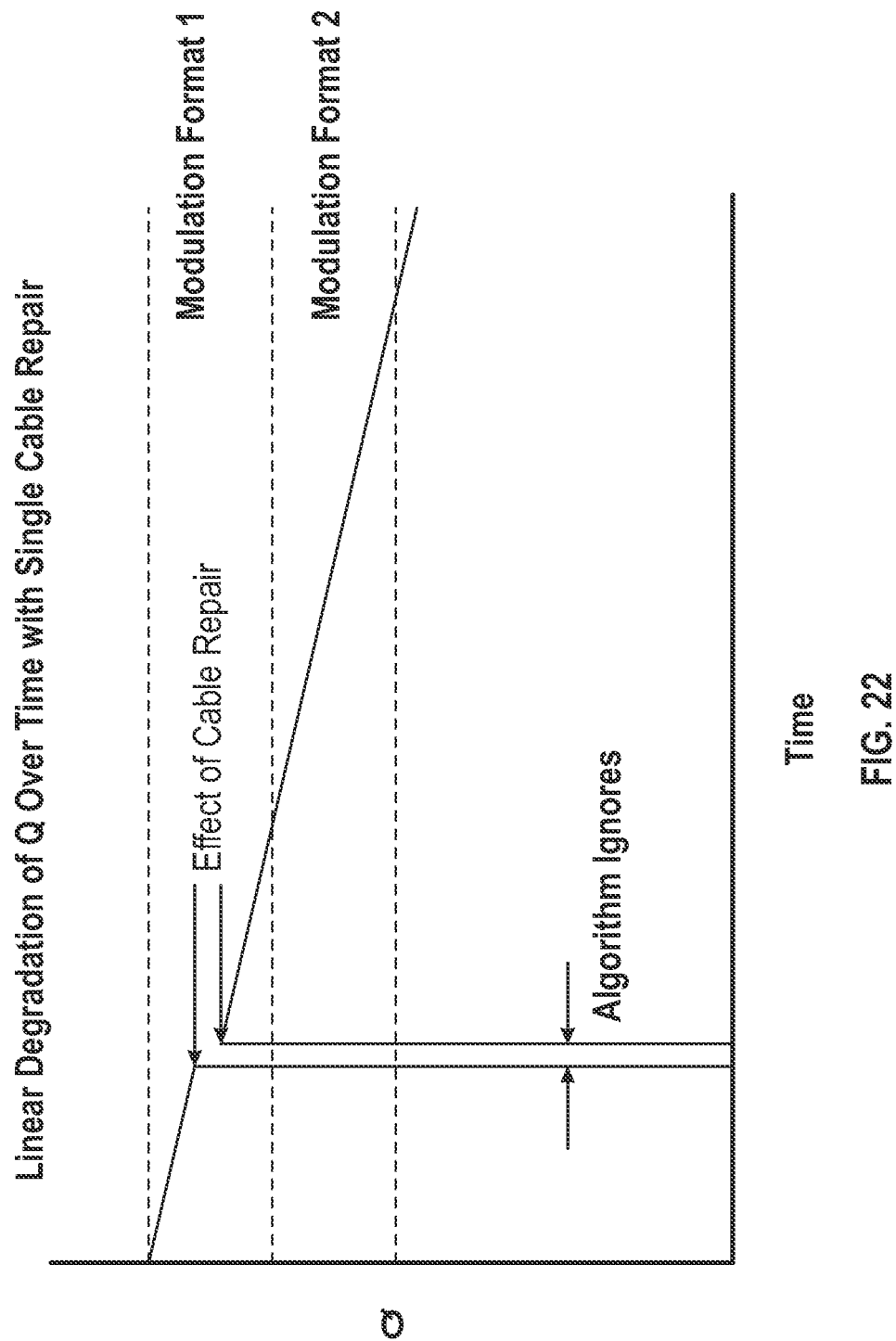
FIG. 22 is another graph showing a linear degradation of Q over time in an subsea optical communication system having a single cable repair.
Figure 23:
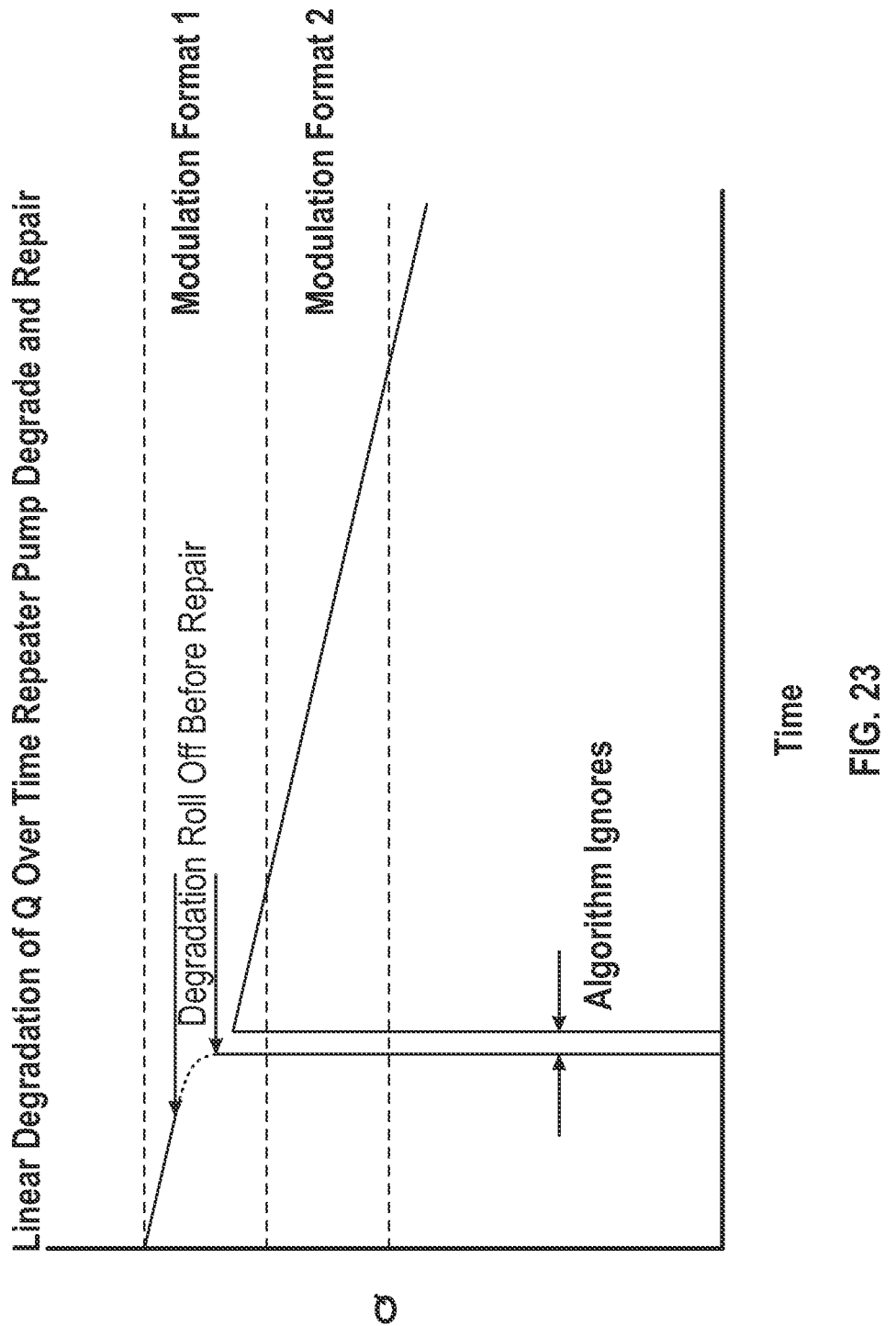
FIG. 23 is another graph showing a linear degradation of Q over time in an subsea optical communication system having a repeater pump degrade and repair.

FIG. 20 is a graph showing a linear degradation of Q over time in an exemplary subsea optical communication system. FIG. 21 is a graph showing a linear degradation of Q over time in an subsea optical communication system having a single cable repair. FIG. 22 is another graph showing a linear degradation of Q over time in an subsea optical communication system having a single cable repair. FIG. 23 is another graph showing a linear degradation of Q over time in an subsea optical communication system having a repeater pump degrade and repair. The graphs of FIGS. 20-23 take a simplistic overview of Q performance degradation where Q is degrading at a linear rate. Although the graphs are linear for degradation rates and therefore would not require artificial intelligence, in reality the inventors believe that this degradation would at first be linear then become likely logarithmic as components age. This combined with the multiple factors that degrade performance, make the inventors believe that the degradation prediction algorithm would be best implemented using artificial intelligence to make required decisions regarding the time(s) for making a modulation format change.

As shown in FIG. 20, modulation format 1 works in a specific Q or OSNR range before modulation format 1 requires changing through degradation due to fiber aging etc. Although the degradation prediction algorithm 98 could use the Q value between modulation format 1 and modulation format 2 as a demarcation for modulation format change, it is envisioned that the modulation format change would occur before the demarcation point such that no errors occur on the system. The modulation format change can be made at any instance of time prior to the demarcation point, such as 15 days, 30 days or the like to ensure that the modulation format change is made before unacceptable errors are introduced.

Operator settings for the degradation prediction algorithm 98 can be supplied by a graphical user interface. The link database 96 may be updated automatically by receiving data from the telecommunication equipment on the span 38 using an application programming interface, for example. The artificial intelligence algorithms within the degradation prediction algorithm 98 may continually learn the characteristics of the cable under analysis. For each event such a cable break/repair, the event is logged into the link database 96, e.g., via a graphical user interface, or an application programming interface. The degradation prediction algorithm 98 then analyzes the performance attributes in the link database 96 associated with particular components, and determines expected time before reconfiguration is required/average Q impact per event. For subsea optical communication system 10 that have multiple events, average time to next event can be calculated and incorporated into degradation results. This value in turn decreases the time to modulation format change. For each event type the repair/replacement degradation impact can be observed by the degradation prediction algorithm, and used to propose a candidate modulation format change, or to make a change in the modulation format without user intervention.

Shown in FIG. 21, is a linear degradation over time with a single cable repair. FIG. 21 shows the impact of that repair. The degradation prediction algorithm 98 can calculate and provide via a graphical user interface, for example, notifications to advise an operator that with X future repairs the estimated time to modulation format change is Y, thereby allowing the conservative operator to apply the next modulation format change if required.

In reality any repair takes time. Consequently, any repair will likely result in either a single or multiple carriers being out of frame with no usable performance data when the repair is made. Performance attributes logged into the link database 96 for a component that is being repaired, would therefore in effect skew the results of the degradation prediction algorithm 98 thereby reducing the time to modulation change. Therefore any carriers that become Loss Of Frame (LOF) either side of a network event are disregarded for analysis during that LOF time span. Conversely any carriers that are either removed or added as part of an upgrade process are logged into the link database 96. FIG. 22 shows an exemplary Q effect of a cable repair, i.e., the Q goes to zero. To avoid skewing the results of the degradation prediction algorithm, such data logged during a repair is either removed from the link database 96 or ignored. The degradation prediction algorithm 98 can be notified of a repair by an operator using the graphical user interface. Or, the degradation prediction algorithm 98 can determine that the link 21 is being repaired when an out of frame event, or an optical loss of signal event is detected.

Degradation is not limited to fiber aging and the subsea optical communication system 10 is constructed of many parts including power feed equipment supplying power to the repeaters 30, or the data terminal stations 14a and 14b. It is envisioned that the control systems 88 would include an open API config such that performance attributes from various equipment manufacturers can be logged into the link database 96. This could encompass items such as Power Feed Equipment (PFE) currents correlating those currents to optical performance to determine mode change (e.g., modulation format change) candidate date or candidate instant of time. In some embodiments, the software causes a processor to determine the candidate date or candidate instant of time to change a first m-quadrature amplitude modulation format to a second m-quadrature amplitude modulation format. The candidate date or candidate instant of time is prior to when errors above a threshold are predicted to occur in the link using the first m-quadrature amplitude modulation format. Once a candidate date is determined, control signals to configure transmitter block(s) and receiver block(s) are provided based upon the candidate date. During each cable repair, extra subsea cable may be introduced to replace broken sections thereby correlating PFE current to performance. This information can then also be used for operators wanting to reduce PFE currents whilst maintaining a set optical performance. This value could be used to reduce such currents to reduce component degradation over time or to reduce operational costs of the first terminal station 14a, the second terminal station 14b or the costs of any component located underneath water. Components located underneath water may be referred to herein as a "wet plant."

The other major part of a wet plant are the undersea optical amplifiers also referred to repeaters 30. The link database 96 may also obtain performance data from components of the wet plant, such as the repeaters 30, e.g., the link database 96 may poll the repeaters 30. This performance data would be used by the degradation prediction algorithm 98 to correlate repeater gain changes to line card performance and the associated impact on timelines derived. From this correlated performance data, the degradation prediction algorithm 98 may identify repeaters 30, for example, that have different performance attributes than other repeaters 30 and send an alert to an operator terminal so as to notify an operator thereby reducing outages due to repeater pump failures. For example, in some embodiments, the repeaters 30 provide performance attributes, such as pump current, pump power, pump temperature, repeater received light level (RLL) and output send light level (SLL) values. By monitoring the changes of these performance attributes over time, repeater aging for each repeater 30 can be measured. Further, Significant changes in performance attributes (e.g., RLL, SLL or pump power) of a given repeater 30 relative to the other repeaters 30 indicates that the given repeater 30 is out of line with the other repeaters 30. In this instance, the degradation prediction algorithm 98 may send the alert to the operator terminal. The degradation prediction algorithm 98 may also determine inter repeater 30 span loss changes and correlate the inter repeater span loss changes to Q changes across the communication system 10 thereby estimating performance impact per repair and producing a more accurate decision on whether or not to change the modulation format. For example, FIG. 23 shows the degradation rolloff prior to a repair, as well as correlated degradation and adjusted degradation time before next modulation format change. Repeater span losses are calculated by taking the optical power OUT of a repeater 30 (SLL) and the receive power in (RLL) for a downstream receiver, and then calculating the difference. Using span loss calculations and changes per span with corresponding changes in Q can be correlated over time to see where span degradation happens most and highlighting spans that have the most detrimental impact. In other words, the receiver OSNR depends on the span loss as well as other parameters, such as repeater output power and the like. An increase in the span loss will reduce the receiver OSNR. Because Q is related to receiver OSNR, the impact of a span loss increase on Q can be calculated.

As Q is correlated to receive OSNR, the degradation prediction algorithm 98 may also correlate the Q to carrier receive OSNR. These OSNR values can be taken either directly from a line card or through an Optical Power Measurement (OPM) of the individual Wavelength Selector Switch (WSS). The degradation prediction algorithm 98 would not only correlate Q versus receive OSNR over time alongside any external factors previously mentioned but can be used for automated deployment of systems using software tools to configure nodes, such as the transmitter blocks 12-1-12-n, or receiver blocks 22-1-22-n.

Any modulation format change has an effect on digital traffic paths either through physical interface changes or reduced line side capacities. Therefore, the link database 96 also includes physical layout data of the communication system 10 so that the degradation prediction algorithm 98 may also analyze the physical layout of the communication system 10 to then determine, change, or advise the user of what optical interfaces require moving or adding and time required upon mode change. The degradation prediction algorithm may also include a software mechanism, such as a "go button" that upon activation causes the degradation prediction algorithm to reconfiguring all parameters and circuits both digitally and optically leaving only fiber physical movement. Part of the reconfiguration may also include overhead IP address information change to provide appropriate IP addressing, and any optical amplifier optical passbands to be re ordered or reconfigured. When a modulation format of a channel is changed the bandwidth of the channel will also change. Therefore, the bandwidth of a wavelength selective switch or other device used to filter out the signal may also need to be changed to be operable with the change in the modulation format.

The degradation prediction algorithm 98 may also estimate system performance using external modelling for a given deployment type to create a Power Budget Table (PBT). The PBT could be derived on a per fibre pair basis far more accurately using the link database 96 and the degradation prediction algorithm 98 thereby increasing delivered capacity per upgrade.

Figure 24:
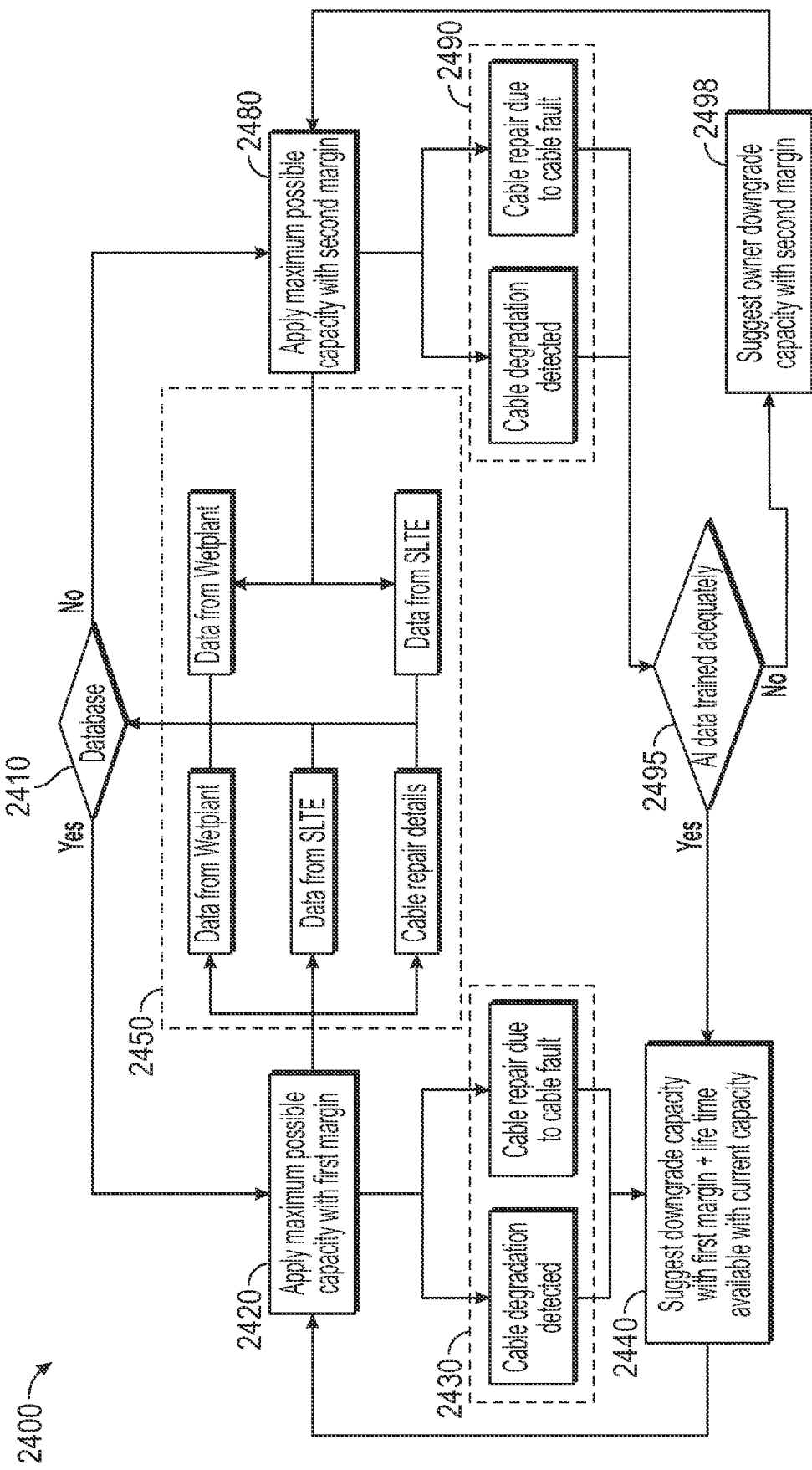
FIG. 24 is a flow chart of an automated process for setting capacity of a link within the subsea optical communication system in accordance with the present disclosure.

FIG. 24 is a flow chart of an automated process 2400 used by the degradation prediction algorithm 98 for setting capacity of at least one link 21 within the subsea optical communication system 10 in accordance with the present disclosure. The automated process 2400 will be described by way of example as analyzing the link 21 within the subsea optical communication system 10. It should be understood, however, that the automated process 2400 sequences through various records within the link database 96 that may be associated with telecommunication paths, telecommunication segments, links, or components. Further, the automated process 2400 determine the modulation format and/or changes to the modulation format for carriers and/or subcarriers independently on each of the telecommunication paths, telecommunication segments, links, or components within the link database 96. Thus, the determination of whether or not degradation or cable repair will result in a downgrade of data rate and/or capacity will be made on a carrier by carrier basis, and/or a subcarrier by subcarrier basis.

Initially, the automated process 2400 determines whether the link 21 is associated with a particular record within the link database 96 at a step 2410. If so, the automated process 2400 branches to a step 2420 where the automated process 2400 applies a maximum possible capacity to the link 21 with a first margin, which may be 0.5 dB. The automated process 2400 then branches to a degradation determination step 2430 to determine whether or not the link 21 can be considered degraded. Specifically, the step 2430 checks to see whether any degradation has been determined with respect to the link 21, and/or whether the link 21 has been subject to a repair due to a cable fault, for example. The degradation prediction algorithm 98 determines the predicted level of degradation of the link 21 over time due to aging of the optical fiber link 21. The degradation prediction algorithm 98 may also determine the predicted level of degradation of the link 21 over time due to aging of a repeater supplying data into the link 21. In some embodiments, the link 21 has an age performance attribute stored in the link database 96. Where the performance data is time based, and includes at least one performance attribute measured on the link 21 at various instants of time, the artificial intelligence algorithm of the degradation prediction algorithm may calculate the predicted level of degradation of the link 21 over time based upon the age of the link 21 and changes in the performance attribute, e.g., falling OSNR, at the various instants of time.

If so, the automated process 2400 branches to a step 2440 to suggest to downgrade capacity on the link 21. The suggested downgrade can be on the order of the first margin, e.g., 0.5 dB. If the suggested downgrade is accepted, the automated process 2400 branches to the step 2420 to downgrade the capacity for the link 21 by the first margin. Then, the automated process 2400 branches to an updating step 2450 where performance data such as data from wet plants, e.g., the repeaters 30, signal link terminating equipment such as the terminal stations 14a in 14b is collected, and any associated cable repair details are loaded within the link database 96. The process then repeats for another component and/or carrier, or subcarrier within the link database 96.

If it is determined that the link 21, for example is either not within the link database 96 at the step 2410, then the automated process 2400 branches to a step 2480 to apply a maximum possible capacity with a second margin larger than the first margin. For example, the second margin can be 1.0 dB. Once the capacity for the link 21 is set at the step 2480, the automated process 2400 branches to a step 2490 to determine whether any cable degradation has been detected, or whether a cable repair has been added to the link database 96. If not, in the automated process 2400 branches to the step 2410 to analyze another carrier, subcarrier, or component within the link database 96. If any cable degradation has been detected, or a cable repair has been added to the link database 96, then the automated process 2400 branches to a step 2495 to determine whether the degradation prediction algorithm 98 has been trained adequately for the particular component being analyzed, such as the link 21. If so, the automated process branches to the step 2440 and suggests a downgrade data rate and/or capacity with the first margin. If not, the automated process 2400 branches to a step 2498 and suggests a downgrade of the capacity with the second margin. The second margin may be 0.5 dB more than the first margin.

Thus, in some embodiments, the degradation prediction algorithm 98 determines whether the link database 96 stores the performance data related to the link 21, for example, and responsive to the link database 96 storing the performance data related to the link 21, the selected or second data rate is a first amount less than the first or previous data rate, and responsive to the link database 96 not storing the performance data, the selected or second data rate is a second amount less than the previous or first data rate, the second amount being greater than the first amount.

Figure 25:
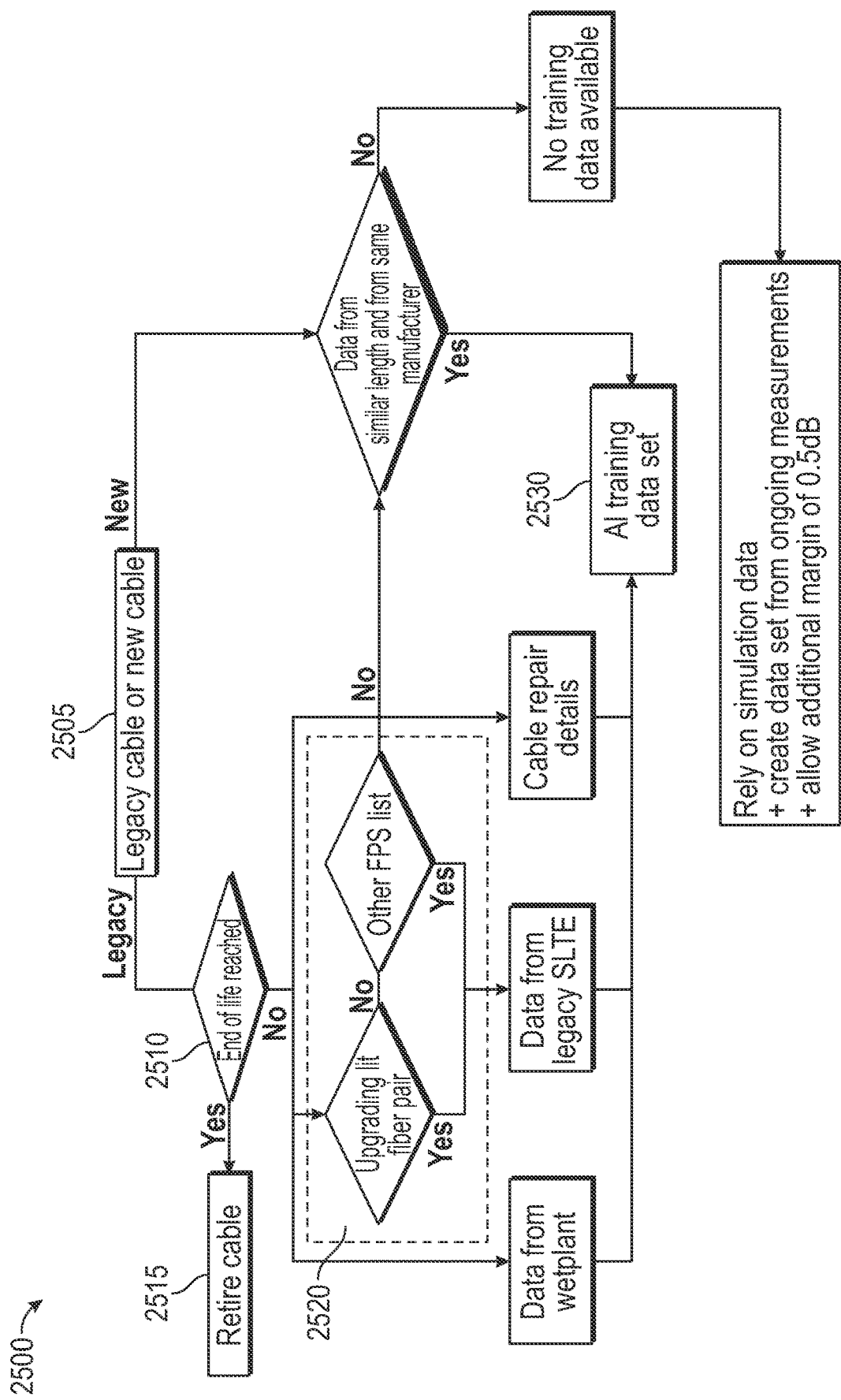
FIG. 25 is a flow chart of a process for training an artificial intelligence module in accordance with the present disclosure for estimating degradation of a link of the subsea optical communication system.

FIG. 25 is a flow chart of a process 2500 for training an artificial intelligence engine of the degradation prediction algorithm 98 in accordance with the present disclosure for estimating degradation of the link 21, for example, of the subsea optical communication system 10. The process 2500 is shown and described using the example of determining degradation of a fiber-optic cable. It should be understood, however, that process 2500 can also be used for training the artificial intelligence engine with respect to other types of components.

To train the artificial intelligence engine, the process 2500 receives an identifier of a legacy fiber-optic cable or a new fiber-optic cable of the link 21. The identifier is then used to determine whether the identifier identifies a legacy fiber-optic cable or a new fiber-optic cable at a step 2505. If the identifier identifies a legacy cable, the process 2500 branches to a step 2510 to determine whether the useful life of the cable is ended. If so, the process 2500 branches to a step 2515 in which the cable is retired. If not, the process 2500 branches to a step 2520 to determine whether the legacy cable should be replaced or upgraded, and if so the process 2500 branches to a step 2525 and obtains data indicative of performance attributes of the new or upgraded cable and stores the performance data with appropriate labels into an artificial intelligence training data set 2530. If no training data is available, then simulation data for link having similar characteristics as the new or replaced link is then added into the artificial intelligence training data set 2530. If the fiber-optic cable is not to be upgraded and/or replaced, then data from the wet plant, or from the signal link terminating equipment such as the data terminal station 14a and 14b is added to the artificial intelligence training data set with appropriate labels for training the artificial intelligence engine.

Figure 26:
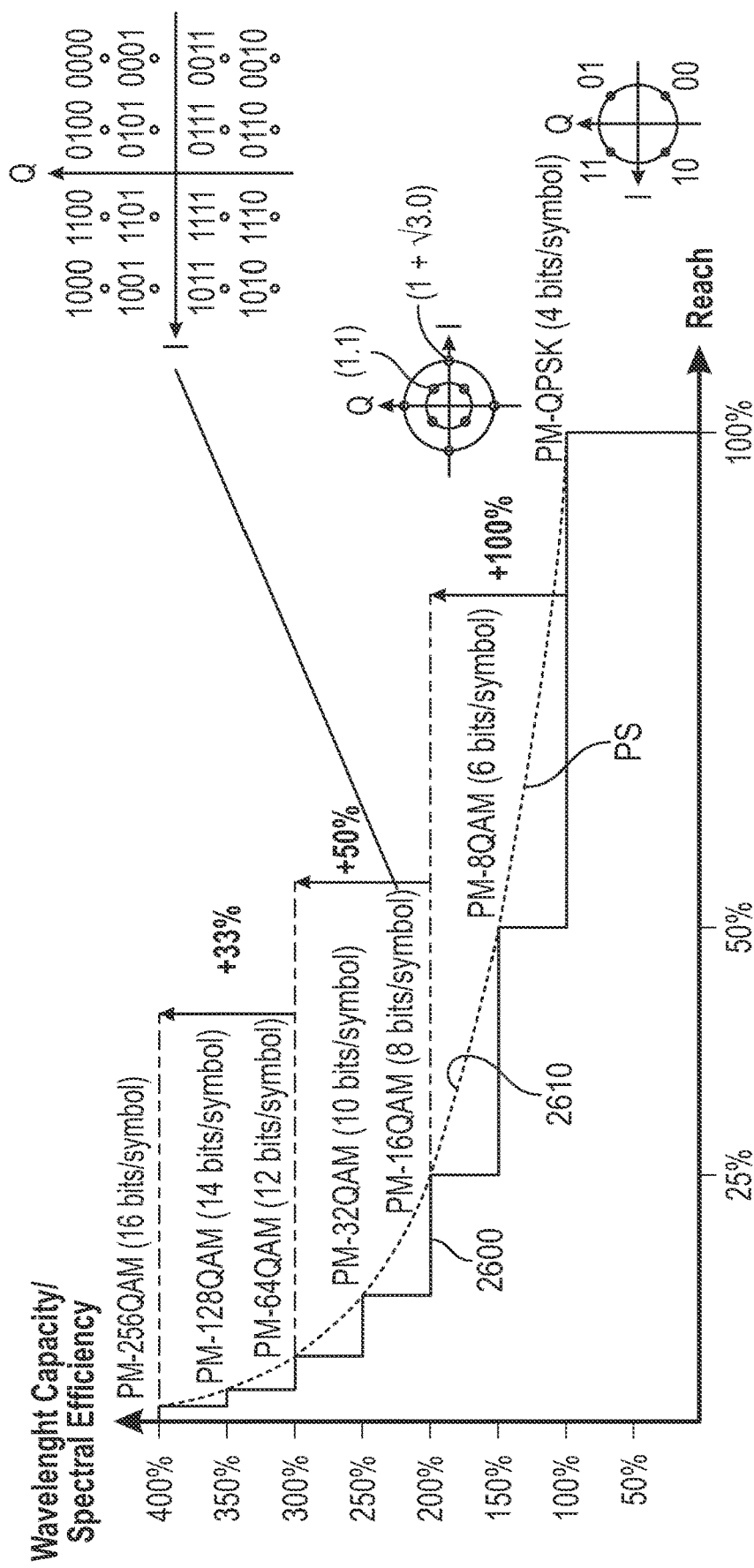
FIG. 26 is a graph showing how the wavelength capacity of various modulation formats relate to the Shannon limit regarding the signal to noise ratio compared to a reach of the optical fiber link.

FIG. 26 includes a first graph 2600 and a second graph 2610 showing how the wavelength capacity of various modulation formats relate to the Shannon limit regarding the signal to noise ratio compared to a reach of the optical fiber link. The first graph 2600 is a graph of the wavelength capacity/reach of several modulation protocols. As shown in FIG. 26, modulation protocols where the probability of each constellation point is uniform have a higher wavelength capacity but reduced reach of the fiber optic cable before unacceptable errors begin. For example, PM-256QAM, PM-128 QAM have a higher wavelength capacity but a shorter reach than PM-16 QAM. The second graph 2610 is the wavelength capacity/reach of PM-256 QAM using probabilistic shaping where the probabilities of the constellation points can be set in a non-uniform matter as discussed above. As can be seen, switching between modulation protocols results in a stair-step curve where each change between the modulation protocols results in a significant reduction in data rate and capacity. Using probabilistic shaping, however, provides much less reduction in data rate and capacity and thereby results in a much smoother curve.

Figure 27:
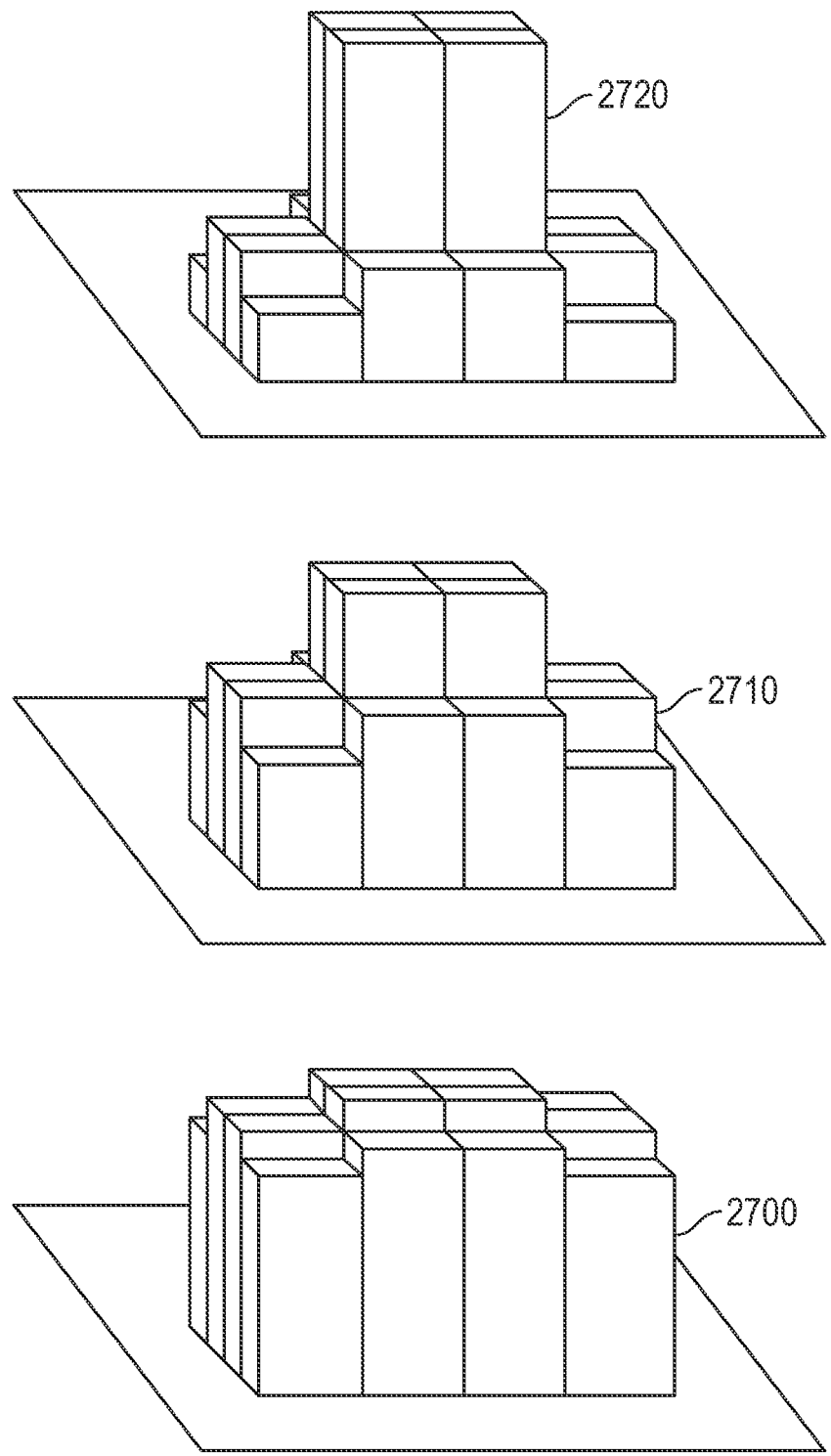
FIG. 27 shows a graphical representation of three different probability distributions corresponding to the constellation point probabilities shown in FIG. 18.

FIG. 27 shows a graphical representation of a first probability distribution 2700, a second probability distribution 2710 and a third probability distribution 2720 for first, second and third modulations formats corresponding to the constellation point probabilities shown in FIG. 18 to provide an example of how the probability distributions may be changed resulting in different modulation formats having the same modulation protocol to reduce the capacity and/or data rate of the modulation protocol. When the link 21 is new, for example, it is envisioned that a modulation format having the first probability distribution 2700 would be selected. The first modulation format having the first probability distribution 2700 has relatively uniform probabilities for each of the constellation points and will be selected to provide a first data rate being the highest data rate and/or capacity of the modulation protocol. As the link 21 degrades over time or due to repair, the second modulation format having the second probability distribution 2710 may be selected. The second modulation format has a second data rate that is less than the first data rate. In some embodiments, the second data rate is less than or equal to 0.5 dB less than the first data rate. The second modulation format has lower probabilities associated with outer constellation points with higher amplitude and therefore more energy/power associated with the outer constellation points. The second modulation format has higher probabilities associated with inner constellation points. The inner constellation points have a lower amplitude and therefore less energy/power associated with the inner constellation points. As the link 21 continues to degrade over time or due to repair, the third modulation format having the third probability distribution 2720 may be selected. Specifically, the third modulation format 2720 has a third data rate that is less than the second data rate. The third modulation format 2720 has even lower probabilities associated with outer constellation points. The third modulation format 2720 has higher probabilities associated with the inner constellation points. The inner constellation points have a lower amplitude and therefore less energy/power associated with the inner constellation points.

In use, the processor 92 measures at least one performance attribute of the link 21, for example, at a plurality of instants of time. The link 21 is carrying data, generated by at least one of the transmitter blocks 12-1-12-n of the first terminal station 14a towards at least one of the receiver blocks 22-1-22-n of the second terminal station 14b. The at least one performance attribute is stored in the link database 96 with the at least one performance attribute being associated with the link 21.

The processor 92 analyzes multiple instants of the at least one performance attribute associated with the link 21 repeatedly with the degradation prediction algorithm 98 to determine a predicted level of degradation of the link 21 over time. The processor 92 provides first control signals to the transmitter block 12-1 of the first terminal station 14a, and second control signals to the receiver block 22-1 of the second terminal station 14b, for example, based upon the predicted level of degradation of the link 21 over time. The first control signals cause the transmitter block 12-1 to encode data to be transmitted over the link 21 in a second m-quadrature amplitude modulation format. The second control signals cause the receiver block 22-1, for example, to decode data received from the link 21 using the second m-quadrature amplitude modulation format.

Other embodiments will be apparent to those skilled in the art from consideration of the specification. For example, although probability distributions are disclosed above in which symbols associated with inner (lower amplitude) constellation points are transmitted with a higher probability than symbols associated with the outer constellation points, it is understood that codewords may be encoded and decoded in a manner similar to that described above to provide probability distributions in which symbols associated with the outer constellation points are transmitted more frequently and with higher probability than symbols associated with the inner constellation points. It is intended that the specification and examples be considered as exemplary only, with a true scope and spirit of the invention being indicated by the following claims.

What is claimed is:

1. A control circuit, comprising:
    a processor; and
    at least one non-transitory computer readable medium coupled to the processor, the non-transitory computer readable medium storing logic that when executed by the processor causes the processor to:
    analyze performance information related to a link, whereby data is transmitted over the link, the data being transmitted by a transmitter block of a first terminal station, the data being received by a receiver block of a second terminal station, the second terminal station being operable to store a degradation prediction algorithm to determine a predicted level of degradation of the link, the data being encoded in a first m-quadrature amplitude modulation format, the link being an uninterrupted segment of fiber optic cable;
    provide first control signals to the transmitter block of the first terminal station, and second control signals to the receiver block of the second terminal station based upon the predicted level of degradation of the link, the first control signals causing the transmitter block to encode data to be transmitted over the link in a second m-quadrature amplitude modulation format, the second control signals causing the receiver block to decode data received from the link using the second m-quadrature amplitude modulation format.

2. The control circuit of claim 1, wherein the first m-quadrature amplitude modulation format has a first data rate, and the second m-quadrature amplitude modulation format has a second data rate, the second data rate being less than the first data rate.

3. The control circuit of claim 2, wherein the second data rate is less than or equal to 0.5 dB less than the first data rate.

4. The control circuit of claim 3, further comprising a link database stored within the at least one non-transitory computer readable medium, wherein the degradation prediction algorithm determines whether the link database stores the performance information related to the link, and responsive to the link database storing the performance information related to the link, the second data rate being a first amount less than the first data rate, and responsive to the link database not storing the performance information, the second data rate being a second amount less than the first data rate, the second amount being greater than the first amount.

5. The control circuit of claim 1, wherein the performance information includes a Q factor for the link, wherein a higher Q factor indicates a lower level of energy loss for optical signals traversing the link, and a lower Q factor indicates a higher level of energy loss for optical signals traversing the link.

6. The control circuit of claim 1, wherein the logic that when executed by the processor causes the processor to determine a candidate date to change the first m-quadrature amplitude modulation format to the second m-quadrature amplitude modulation format, the candidate date being prior to when errors above a threshold are predicted to occur in the link using the first m-quadrature amplitude modulation format, and wherein the first control signals and the second control signals are provided based upon the candidate date.

7. The control circuit of claim 1, wherein the logic that when executed by the processor causes the processor to determine a candidate instant of time to change the first m-quadrature amplitude modulation format to the second m-quadrature amplitude modulation format, the candidate instant of time being indicative of when errors above a threshold are predicted to occur in the link using the first m-quadrature amplitude modulation format, and wherein the first control signals and the second control signals are provided based upon the candidate instant of time.

8. The control circuit of claim 1, wherein the degradation prediction algorithm determines the predicted level of degradation of the link due to aging of the link, the link including optical fiber.

9. The control circuit of claim 1, wherein the degradation prediction algorithm determines the predicted level of degradation of the link due to aging of a repeater supplying data into the link.

10. The control circuit of claim 1, wherein link has an age, and wherein the degradation prediction algorithm includes an artificial intelligence algorithm, and wherein the performance information is time based and includes at least one performance attribute measured on the link at various instants of time, and wherein the artificial intelligence algorithm calculates the predicted level of degradation of the link based upon the age of the link and changes in the performance attribute at the various instants of time.

11. The control circuit of claim 1, wherein the link has an initial data rate, and wherein the first m-quadrature amplitude modulation format is configured to convey the data at the initial data rate.

12. The control circuit of claim 1, wherein the data includes first symbols associated with a first amplitude and second symbols associated with a second amplitude, the first symbols being transmitted more frequently than the second symbols based on a first distribution, the first distribution being associated with the first m-quadrature amplitude modulation format.

13. The control circuit of claim 1, wherein the first m-quadrature amplitude modulation format and the second m-quadrature amplitude modulation format conform to requirements of a same m-quadrature amplitude modulation protocol.

14. A method, comprising:
    transmitting data on a link;
    measuring at least one performance attribute of a link at a plurality of instants of time, the data being encoded with a first m-quadrature amplitude modulation format, the link carrying data, generated by a transmitter block of a first terminal station, towards a receiver block of a second terminal station;
    storing the at least one performance attribute in a link database with the at least one performance attribute being associated with the link;

analyzing multiple instants of the at least one performance attribute associated with the link repeatedly with a degradation prediction algorithm to determine a predicted level of degradation of the link; and provide first control signals to the transmitter block of the first terminal station, and second control signals to the receiver block of the second terminal station based upon the predicted level of degradation of the link, the first control signals causing the transmitter block to encode data to be transmitted over the link in a second m-quadrature amplitude modulation format, the second control signals causing the receiver block to decode data received from the link using the second m-quadrature amplitude modulation format.

15. The method of claim 14, further comprising the step of determining a candidate date to change the first m-quadrature amplitude modulation format to the second m-quadrature amplitude modulation format, the candidate date being prior to when errors above a threshold are predicted to occur in the link using the first m-quadrature amplitude modulation format, and wherein the first control signals and the second control signals are provided based upon the candidate date.

16. The method of claim 14, wherein the data includes first symbols associated with a first amplitude and second symbols associated with a second amplitude, the first symbols being transmitted more frequently than the second symbols based on a first distribution, the first distribution being associated with the first m-quadrature amplitude modulation format.

17. A control circuit, comprising:
a processor; and
at least one non-transitory computer readable medium coupled to the processor, the non-transitory computer readable medium storing logic that when executed by the processor causes the processor to:
analyze performance information related to a link, whereby data is transmitted over the link by a transmitter block of a first terminal station, a receiver block of a second terminal station receives the data, the second terminal station storing a degradation prediction algorithm to determine a predicted level of degradation of the link, the data being encoded in a first modulation format, the link being an uninterrupted segment of fiber optic cable;

provide first control signals to the transmitter block of the first terminal station, and second control signals to the receiver block of the second terminal station based upon the predicted level of degradation of the link, the first control signals causing the transmitter block to encode data to be transmitted over the link in a second modulation format, the second control signals causing the receiver block to decode data received from the link using the second modulation format, the first and second modulation format conforming to requirements of a same m-quadrature amplitude modulation protocol.

18. The control circuit of claim 17, wherein the first modulation format has a first data rate, and the second modulation format has a second data rate, the second data rate being less than the first data rate.

19. The control circuit of claim 17, further comprising a link database stored within the at least one non-transitory computer readable medium, wherein the degradation prediction algorithm determines whether the link database stores the performance information related to the link, and when the link database stores the performance information related to the link, a second data rate is less than a first data rate, and when the link database does not store the performance information, the second data rate is greater than the first data rate.

20. The control circuit of claim 17, wherein the data includes first symbols associated with a first amplitude and second symbols associated with a second amplitude, the first symbols being transmitted more frequently than the second symbols based on a first distribution, the first distribution being associated with the first modulation format.

* * * * *